(12) United States Patent
Nikolov

(10) Patent No.: US 6,629,575 B2
(45) Date of Patent: Oct. 7, 2003

(54) VEHICLE OCCUPANT EMERGENCY SYSTEM

(76) Inventor: Dimitar Nikolov, 14 Invergordon Ave., Scarborough, Ontario (CA), M1S 2Y8

( * ) Notice: Subject to any disclaimer, the term of this patent is extended or adjusted under 35 U.S.C. 154(b) by 0 days.

(21) Appl. No.: 10/128,293

(22) Filed: Apr. 24, 2002

(65) Prior Publication Data

US 2002/0147535 A1 Oct. 10, 2002

(51) Int. Cl.$^7$ ................................................ B60K 28/12
(52) U.S. Cl. ............... 180/282; 297/216.1; 297/216.15; 297/216.16; 297/216.18
(58) Field of Search ................................. 180/282, 271; 280/735, 734; 297/216.1, 216.13, 216.14, 216.15, 216.16, 216.18

(56) References Cited

U.S. PATENT DOCUMENTS

| | | | | |
|---|---|---|---|---|
| 4,090,580 A | * | 5/1978 | McLennan | ................... 180/282 |
| 5,398,185 A | | 3/1995 | Omura | |
| 5,626,203 A | | 5/1997 | Habib | |
| 5,642,916 A | | 7/1997 | Dybro | |
| 5,743,591 A | * | 4/1998 | Tame | ....................... 297/216.1 |
| 5,947,543 A | | 9/1999 | Hubbard | |
| 6,227,597 B1 | | 5/2001 | Swann | |
| 6,254,164 B1 | | 7/2001 | Kawamura | |

* cited by examiner

Primary Examiner—Paul N. Dickson
Assistant Examiner—Faye M. Fleming

(57) ABSTRACT

A vehicle occupant emergency system comprising: a front seat; a front seat horizontal adjuster; a front seat seat-belt system; releasing devices for releasing the front seat from its pre-emergency horizontal adjustment; moving devices for moving the front seat rearward; stopping members for controlling a maximum extent to which the front seat can be moved rearward; restraining members for restraining the front seat from moving forward after its rearward movement; sensors for sensing a multiplicity of characteristics relative to an emergency; and a control unit for operating the releasing devices and the moving devices in an emergency depending on the received signals from the sensors and its programming. The vehicle occupant emergency system may comprise: locking devices for preventing the front seat from moving forward after its rearward movement or relative to its pre-emergency horizontal adjustment; preventing devices for preventing the front seat from moving further rearward relative to its post-emergency position; a rear seat; a rear seat seat-belt system; belt-pretensioning devices; and sensors for sensing a multiplicity of characteristics relative to an emergency with respect to the rear seat and to the rear seat seat-belt system. The front seat may be provided with a multiplicity of positions to which it can be moved rearward. The front seat may be provided with a variable maximum extent to which it can be moved rearward.

60 Claims, 15 Drawing Sheets

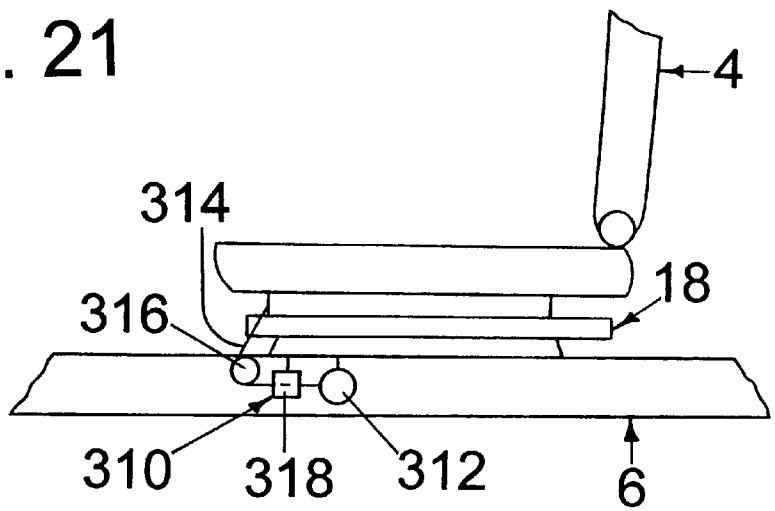
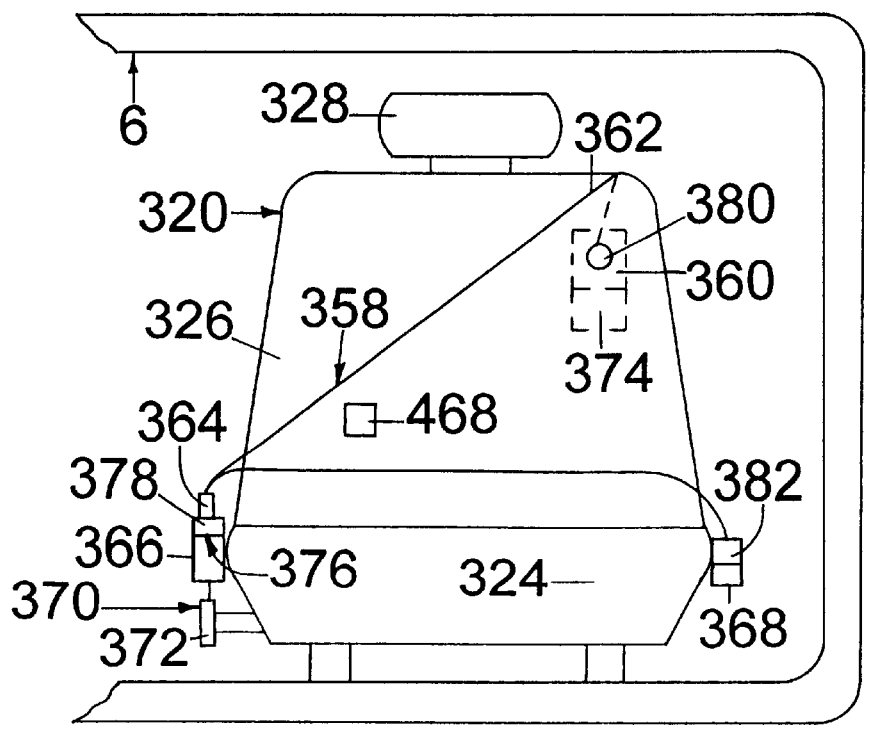

VEHICLE OCCUPANT EMERGENCY SYSTEM

BACKGROUND OF THE INVENTION

The present invention relates to a vehicle occupant emergency system and, more particularly, to a vehicle seat which can be moved rearward for protecting a vehicle occupant in the event of a vehicle collision.

A variety of safety systems has been devised for vehicle occupant safety. The most commonly employed systems include seat-belts, air-bags and crumple zones. However, in the event of a severe vehicle collision these systems may not protect adequately an occupant in a front vehicle seat from vehicle cabin intrusion and they may not absorb adequately the occupant's kinetic energy.

Various proposals have been made to a front vehicle seat which can be moved rearward for protecting an occupant in the front vehicle seat in the event of a severe vehicle collision. Some of these proposals have not been applied to a front vehicle seat having a conventional horizontal adjuster. Some other of these proposals have not been integrated with sensors for sensing the occupancy of a rear vehicle seat, the position of an occupant in the rear vehicle seat, and the restraint status of the occupant in the rear vehicle seat.

It is desirable to have a vehicle occupant emergency system which is applied to a front vehicle seat having a conventional horizontal adjuster and which is integrated with sensors for sensing a multiplicity of characteristics relative to an emergency, such as the occupancy of the front vehicle seat, the occupancy of a rear vehicle seat, the position of an occupant in the front vehicle seat, the position of an occupant in the rear vehicle seat relative to the rear end of the front vehicle seat, the restraint status of the occupant in the front vehicle seat, and the restraint status of the occupant in the rear vehicle seat.

BRIEF SUMMARY OF THE INVENTION

The present invention consists of a vehicle occupant emergency system mounted in an automotive vehicle for protecting at least one occupant of the automotive vehicle. According to one aspect of the invention, the vehicle occupant emergency system comprises: a front vehicle seat for accommodating at least one occupant of the automotive vehicle; horizontal adjusting means for providing the front vehicle seat with a multiplicity of horizontal adjustments relative to the automotive vehicle, the horizontal adjusting means maintaining the front vehicle seat at each one of the multiplicity of horizontal adjustments; system controlling means for operating the vehicle occupant emergency system; first sensing means for sensing characteristics of a vehicle collision, the first sensing means being connected to the system controlling means and providing signals to the system controlling means indicative of the sensed characteristics; second sensing means for sensing characteristics of the automotive vehicle, the second sensing means being connected to the system controlling means and providing signals to the system controlling means indicative of the sensed characteristics; third sensing means for sensing characteristics of the environment inside and outside of the automotive vehicle, the third sensing means being connected to the system controlling means and providing signals to the system controlling means indicative of the sensed characteristics; releasing means operated by the system controlling means for releasing the front vehicle seat from its pre-emergency horizontal adjustment in the event of a vehicle collision so that the front vehicle seat can be moved rearward relative to its pre-emergency horizontal adjustment; moving means operated by the system controlling means for moving the front vehicle seat rearward relative to its pre-emergency horizontal adjustment in the event of a vehicle collision after the front vehicle seat has been released from its pre-emergency horizontal adjustment by the releasing means, the moving means allowing the front vehicle seat to be adjusted to each one of the multiplicity of horizontal adjustments before a vehicle collision; stopping means for controlling a maximum extent to which the front vehicle seat can be moved rearward relative to its pre-emergency horizontal adjustment by the moving means in the event of a vehicle collision; fourth sensing means for sensing characteristics of the front vehicle seat, the fourth sensing means being connected to the system controlling means and providing signals to the system controlling means indicative of the sensed characteristics; fifth sensing means for sensing characteristics of the at least one occupant in the front vehicle seat, the fifth sensing means being connected to the system controlling means and providing signals to the system controlling means indicative of the sensed characteristics; first restraining means for restraining the at least one occupant in the front vehicle seat; sixth sensing means for sensing characteristics of the first restraining means, the sixth sensing means being connected to the system controlling means and providing signals to the system controlling means indicative of the sensed characteristics; and second restraining means for restraining the front vehicle seat from moving forward after the front vehicle seat has been moved rearward relative to its pre-emergency horizontal adjustment by the moving means; wherein the system controlling means receiving signals from the first sensing means, from the second sensing means, from the third sensing means, from the fourth sensing means, from the fifth sensing means, and from the sixth sensing means, and in the event of a vehicle collision the system controlling means operating the releasing means and the moving means depending on the received signals and its programming. The horizontal adjusting means may be adapted to enable the front vehicle seat to be released from its pre-emergency horizontal adjustment by the releasing means and to be moved rearward relative to its pre-emergency horizontal adjustment by the moving means in the event of a vehicle collision. The horizontal adjusting means may be adapted to enable the front vehicle seat to be moved to the stopping means by the moving means in the event of a vehicle collision. The releasing means may allow the front vehicle seat to be adjusted to each one of the multiplicity of horizontal adjustments before a vehicle collision.

According to one feature of this aspect of the invention, the releasing means may allow the horizontal adjusting means to maintain the front vehicle seat after the front vehicle seat has been moved rearward relative to its pre-emergency horizontal adjustment by the moving means, and the horizontal adjusting means may maintain the front vehicle seat after the front vehicle seat has been moved rearward relative to its pre-emergency horizontal adjustment by the moving means.

According to another feature of this aspect of the invention, the moving means may maintain the front vehicle seat at the stopping means after the front vehicle seat has been moved to the stopping means by the moving means.

According to still another feature of this aspect of the invention, the first restraining means may comprise first pretensioning means operated by the system controlling means for further restraining the at least one occupant in the front vehicle seat, and in the event of a vehicle collision the system controlling means operating the first pretensioning means depending on the received signals and its programming. The vehicle occupant emergency system may further comprise rear sensing means for sensing characteristics of a rear-end vehicle collision, the rear sensing means being connected to the system controlling means and providing signals to the system controlling means indicative of the sensed characteristics.

According to still another feature of this aspect of the invention, the second restraining means may restrain the front vehicle seat from moving forward after the front vehicle seat has been moved to the stopping means by the moving means. The vehicle occupant emergency system may further comprise second releasing means for releasing the front vehicle seat from the second restraining means after a vehicle collision.

According to still another feature of this aspect of the invention, the vehicle occupant emergency system may further comprise locking means operated by the system controlling means for preventing the front vehicle seat from moving forward after the front vehicle seat has been moved rearward relative to its pre-emergency horizontal adjustment by the moving means, and in the event of a vehicle collision the system controlling means operating the locking means depending on the received signals and its programming. The vehicle occupant emergency system may further comprise stop sensing means for activating the locking means after the front vehicle seat has been moved to the stopping means by the moving means.

According to still another feature of this aspect of the invention, the vehicle occupant emergency system may further comprise second locking means for preventing the front vehicle seat from moving forward relative to its pre-emergency horizontal adjustment in the event of a vehicle collision.

According to still another feature of this aspect of the invention, the vehicle occupant emergency system may further comprise preventing means operated by the system controlling means for preventing the front vehicle seat from moving further rearward after the front vehicle seat has been moved rearward relative to its pre-emergency horizontal adjustment by the moving means but not to the stopping means, the preventing means allowing the front vehicle seat to be adjusted to each one of the multiplicity of horizontal adjustments before a vehicle collision, and in the event of a vehicle collision the system controlling means operating the preventing means depending on the received signals and its programming.

According to still another feature of this aspect of the invention, the vehicle occupant emergency system may further comprise at least one switch for switching on and switching off the releasing means and the moving means.

According to still another feature of this aspect of the invention, the vehicle occupant emergency system may be connected with a global positioning system having an automatic collision notification system.

According to still another feature of this aspect of the invention, the vehicle occupant emergency system may further comprise: a rear vehicle seat located behind the front vehicle seat for accommodating at least one occupant of the automotive vehicle; and seventh sensing means for sensing characteristics of the at least one occupant in the rear vehicle seat, the seventh sensing means being connected to the system controlling means and providing signals to the system controlling means indicative of the sensed characteristics; wherein the system controlling means further receiving signals from the seventh sensing means and in the event of a vehicle collision the system controlling means operating the releasing means and the moving means depending on the received signals and its programming. The vehicle occupant emergency system may further comprise: third restraining means for restraining the at least one occupant in the rear vehicle seat; and eighth sensing means for sensing characteristics of the third restraining means, the eighth sensing means being connected to the system controlling means and providing signals to the system controlling means indicative of the sensed characteristics; wherein the system controlling means further receiving signals from the eighth sensing means and in the event of a vehicle collision the system controlling means operating the releasing means and the moving means depending on the received signals and its programming. The third restraining means may comprise second pretensioning means operated by the system controlling means for further restraining the at least one occupant in the rear vehicle seat, and in the event of a vehicle collision the system controlling means operating the second pretensioning means depending on the received signals and its programming. The vehicle occupant emergency system may further comprise rear sensing means for sensing characteristics of a rear-end vehicle collision, the rear sensing means being connected to the system controlling means and providing signals to the system controlling means indicative of the sensed characteristics. The system controlling means may operate the vehicle occupant emergency system a moment before a vehicle collision depending on the received signals and its programming.

According to still another feature of this aspect of the invention, the stopping means may comprise first stopping means for controlling the maximum extent and second stopping means for engaging the first stopping means and controlling the maximum extent, the first stopping means being removable upon application of a removing force, and the vehicle occupant emergency system may further comprise: third stopping means for controlling a second maximum extent to which the front vehicle seat can be moved rearward relative to its pre-emergency horizontal adjustment by the moving means in the event of a vehicle collision, the third stopping means engaging the second stopping means for controlling the second maximum extent; and removing means operated by the system controlling means for applying the removing force to the first stopping means so that the front vehicle seat can be moved to the third stopping means by the moving means in the event of a vehicle collision, and in the event of a vehicle collision the system controlling means operating the removing means depending on the received signals and its programming. The horizontal adjusting means may be adapted to enable the front vehicle seat to be moved to the third stopping means by the moving means in the event of a vehicle collision. The moving means may maintain the front vehicle seat at the first stopping means or at the third stopping means after the front vehicle seat has been moved to the first stopping means or to the third stopping means by the moving means. The second restraining means may restrain the front vehicle seat from moving forward after the front vehicle seat has been moved to the first stopping means or to the third stopping means by the moving means. The vehicle occupant emergency system may further comprise third releasing means for releasing the front vehicle seat from the second restraining means after a vehicle collision. The third stopping means may be operable by the system controlling means and in the event of a vehicle collision the system controlling means may operate the third stopping means depending on the received signals and its programming. The vehicle occupant emergency system may further comprise a switch for switching on and switching off the removing means. The system controlling means may operate the vehicle occupant emergency system a moment before a vehicle collision depending on the received signals and its programming.

According to another aspect of the invention, the vehicle occupant emergency system comprises: a front vehicle seat for accommodating at least one occupant of the automotive vehicle; horizontal adjusting means for providing the front vehicle seat with a multiplicity of horizontal adjustments relative to the automotive vehicle, the horizontal adjusting means maintaining the front vehicle seat at each one of the multiplicity of horizontal adjustments; system controlling means for operating the vehicle occupant emergency system; first sensing means for sensing characteristics of a vehicle collision, the first sensing means being connected to the system controlling means and providing signals to the system controlling means indicative of the sensed characteristics; rear sensing means for sensing characteristics of a rear-end vehicle collision, the rear sensing means being connected to the system controlling means and providing signals to the system controlling means indicative of the sensed characteristics; second sensing means for sensing characteristics of the automotive vehicle, the second sensing means being connected to the system controlling means and providing signals to the system controlling means indicative of the sensed characteristics; third sensing means for sensing characteristics of the environment inside and outside of the automotive vehicle, the third sensing means being connected to the system controlling means and providing signals to the system controlling means indicative of the sensed characteristics; releasing means operated by the system controlling means for releasing the front vehicle seat from its pre-emergency horizontal adjustment in the event of a vehicle collision so that the front vehicle seat can be moved rearward relative to its pre-emergency horizontal adjustment; moving means operated by the system controlling means for moving the front vehicle seat rearward relative to its pre-emergency horizontal adjustment in the event of a vehicle collision after the front vehicle seat has been released from its pre-emergency horizontal adjustment by the releasing means, the moving means allowing the front vehicle seat to be adjusted to each one of the multiplicity of horizontal adjustments before a vehicle collision; stopping means for controlling a maximum extent to which the front vehicle seat can be moved rearward relative to its pre-emergency horizontal adjustment by the moving means in the event of a vehicle collision; fourth sensing means for sensing characteristics of the front vehicle seat, the fourth sensing means being connected to the system controlling means and providing signals to the system controlling means indicative of the sensed characteristics; fifth sensing means for sensing characteristics of the at least one occupant in the front vehicle seat, the fifth sensing means being connected to the system controlling means and providing signals to the system controlling means indicative of the sensed characteristics; first restraining means for restraining the at least one occupant in the front vehicle seat, the first restraining means comprising first pretensioning means operated by the system controlling means for further restraining the at least one occupant in the front vehicle seat; sixth sensing means for sensing characteristics of the first restraining means, the sixth sensing means being connected to the system controlling means and providing signals to the system controlling means indicative of the sensed characteristics; second restraining means for restraining the front vehicle seat from moving forward after the front vehicle seat has been moved rearward relative to its pre-emergency horizontal adjustment by the moving means; locking means operated by the system controlling means for preventing the front vehicle seat from moving forward after the front vehicle seat has been moved rearward relative to its pre-emergency horizontal adjustment by the moving means; preventing means operated by the system controlling means for preventing the front vehicle seat from moving further rearward after the front vehicle seat has been moved rearward relative to its pre-emergency horizontal adjustment by the moving means but not to the stopping means, the preventing means allowing the front vehicle seat to be adjusted to each one of the multiplicity of horizontal adjustments before a vehicle collision; a rear vehicle seat located behind the front vehicle seat for accommodating at least one occupant of the automotive vehicle; seventh sensing means for sensing characteristics of the at least one occupant in the rear vehicle seat, the seventh sensing means being connected to the system controlling means and providing signals to the system controlling means indicative of the sensed characteristics; third restraining means for restraining the at least one occupant in the rear vehicle seat, the third restraining means comprising second pretensioning means operated by the system controlling means for further restraining the at least one occupant in the rear vehicle seat; and eighth sensing means for sensing characteristics of the third restraining means, the eighth sensing means being connected to the system controlling means and providing signals to the system controlling means indicative of the sensed characteristics; wherein the system controlling means receiving signals from the first sensing means, from the second sensing means, from the third sensing means, from the fourth sensing means, from the fifth sensing means, from the sixth sensing means, from the seventh sensing means, from the eighth sensing means, and from the rear sensing means, and in the event of a vehicle collision the system controlling means operating the releasing means, the moving means, the first pretensioning means, the second pretensioning means, the locking means and the preventing means depending on the received signals and its programming. The horizontal adjusting means may be adapted to enable the front vehicle seat to be released from its pre-emergency horizontal adjustment by the releasing means and to be moved rearward relative to its pre-emergency horizontal adjustment by the moving means in the event of a vehicle collision. The horizontal adjusting means may be adapted to enable the front vehicle seat to be moved to the stopping means by the moving means in the event of a vehicle collision. The releasing means may allow the front vehicle seat to be adjusted to each one of the multiplicity of horizontal adjustments before a vehicle collision.

According to one feature of this aspect of the invention, the releasing means may allow the horizontal adjusting means to maintain the front vehicle seat after the front vehicle seat has been moved rearward relative to its pre-emergency horizontal adjustment by the moving means, and the horizontal adjusting means may maintain the front vehicle seat after the front vehicle seat has been moved rearward relative to its pre-emergency horizontal adjustment by the moving means.

According to another feature of this aspect of the invention, the moving means may maintain the front vehicle seat at the stopping means after the front vehicle seat has been moved to the stopping means by the moving means.

According to still another feature of this aspect of the invention, the second restraining means may restrain the front vehicle seat from moving forward after the front vehicle seat has been moved to the stopping means by the moving means. The vehicle occupant emergency system may further comprise second releasing means for releasing the front vehicle seat from the second restraining means after a vehicle collision.

According to still another feature of this aspect of the invention, the moving means may provide the front vehicle seat with a multiplicity of positions to which the front vehicle seat can be moved rearward relative to its pre-emergency horizontal adjustment in the event of a vehicle collision.

According to still another feature of this aspect of the invention, the locking means may provide the front vehicle seat with a multiplicity of positions to which the front vehicle seat can be moved rearward relative to its pre-emergency horizontal adjustment by the moving means in the event of a vehicle collision.

According to still another feature of this aspect of the invention, the preventing means may provide the front vehicle seat with a multiplicity of positions to which the front vehicle seat can be moved rearward relative to its pre-emergency horizontal adjustment by the moving means in the event of a vehicle collision.

According to still another feature of this aspect of the invention, the vehicle occupant emergency system may further comprise stop sensing means for activating the locking means after the front vehicle seat has been moved to the stopping means by the moving means.

According to still another feature of this aspect of the invention, the vehicle occupant emergency system may further comprise second locking means for preventing the front vehicle seat from moving forward relative to its pre-emergency horizontal adjustment in the event of a vehicle collision.

According to still another feature of this aspect of the invention, the vehicle occupant emergency system may further comprise at least one switch for switching on and switching off the releasing means and the moving means.

According to still another feature of this aspect of the invention, the vehicle occupant emergency system may be connected with a global positioning system having an automatic collision notification system.

According to still another feature of this aspect of the invention, the system controlling means may operate the vehicle occupant emergency system a moment before a vehicle collision depending on the received signals and its programming.

According to still another feature of this aspect of the invention, the vehicle occupant emergency system may operate in concert with at least one safety system, at least one safety device and at least one warning system.

According to still another feature of this aspect of the invention, the vehicle occupant emergency system may be integrated with at least one safety system, at least one safety device and at least one warning system.

According to still another feature of this aspect of the invention, the vehicle occupant emergency system may be integrated with at least one other vehicle occupant emergency system.

According to still another feature of this aspect of the invention, the stopping means may comprise first stopping means for controlling the maximum extent and second stopping means for engaging the first stopping means and controlling the maximum extent, the first stopping means being removable upon application of a removing force, and the vehicle occupant emergency system may further comprise: third stopping means for controlling a second maximum extent to which the front vehicle seat can be moved rearward relative to its pre-emergency horizontal adjustment by the moving means in the event of a vehicle collision, the third stopping means engaging the second stopping means for controlling the second maximum extent; and removing means operated by the system controlling means for applying the removing force to the first stopping means so that the front vehicle seat can be moved to the third stopping means by the moving means in the event of a vehicle collision, and in the event of a vehicle collision the system controlling means operating the removing means depending on the received signals and its programming. The horizontal adjusting means may be adapted to enable the front vehicle seat to be moved to the third stopping means by the moving means in the event of a vehicle collision. The moving means may maintain the front vehicle seat at the first stopping means or at the third stopping means after the front vehicle seat has been moved to the first stopping means or to the third stopping means by the moving means. The second restraining means may restrain the front vehicle seat from moving forward after the front vehicle seat has been moved to the first stopping means or to the third stopping means by the moving means. The vehicle occupant emergency system may further comprise third releasing means for releasing the front vehicle seat from the second restraining means after a vehicle collision. The preventing means may prevent the front vehicle seat from moving further rearward after the front vehicle seat has been moved rearward relative to its pre-emergency horizontal adjustment by the moving means but not to the first stopping means or to the third stopping means. The third stopping means may be operable by the system controlling means and in the event of a vehicle collision the system controlling means may operate the third stopping means depending on the received signals and its programming. The vehicle occupant emergency system may further comprise a switch for switching on and switching off the removing means. The system controlling means may operate the vehicle occupant emergency system a moment before a vehicle collision depending on the received signals and its programming. The vehicle occupant emergency system may operate in concert with at least one safety system, at least one safety device and at least one warning system. The vehicle occupant emergency system may be integrated with at least one safety system, at least one safety device and at least one warning system. The vehicle occupant emergency system may be integrated with at least one other vehicle occupant emergency system.

BRIEF DESCRIPTION OF THE SEVERAL VIEWS OF THE DRAWING

FIG. 21 is a schematic view illustrating preventing means;

FIG. 22 is a schematic view illustrating a rear vehicle seat, third restraining means, second pretensioning means, and eighth sensing means;

DETAILED DESCRIPTION OF THE INVENTION

Referring to FIGS. 1–29, a preferred embodiment of the present invention is disclosed which is the vehicle occupant emergency system 2.

For best clarity of the drawings, the electrical connections between the elements of the vehicle occupant emergency system 2 are not shown.

Figure 1:
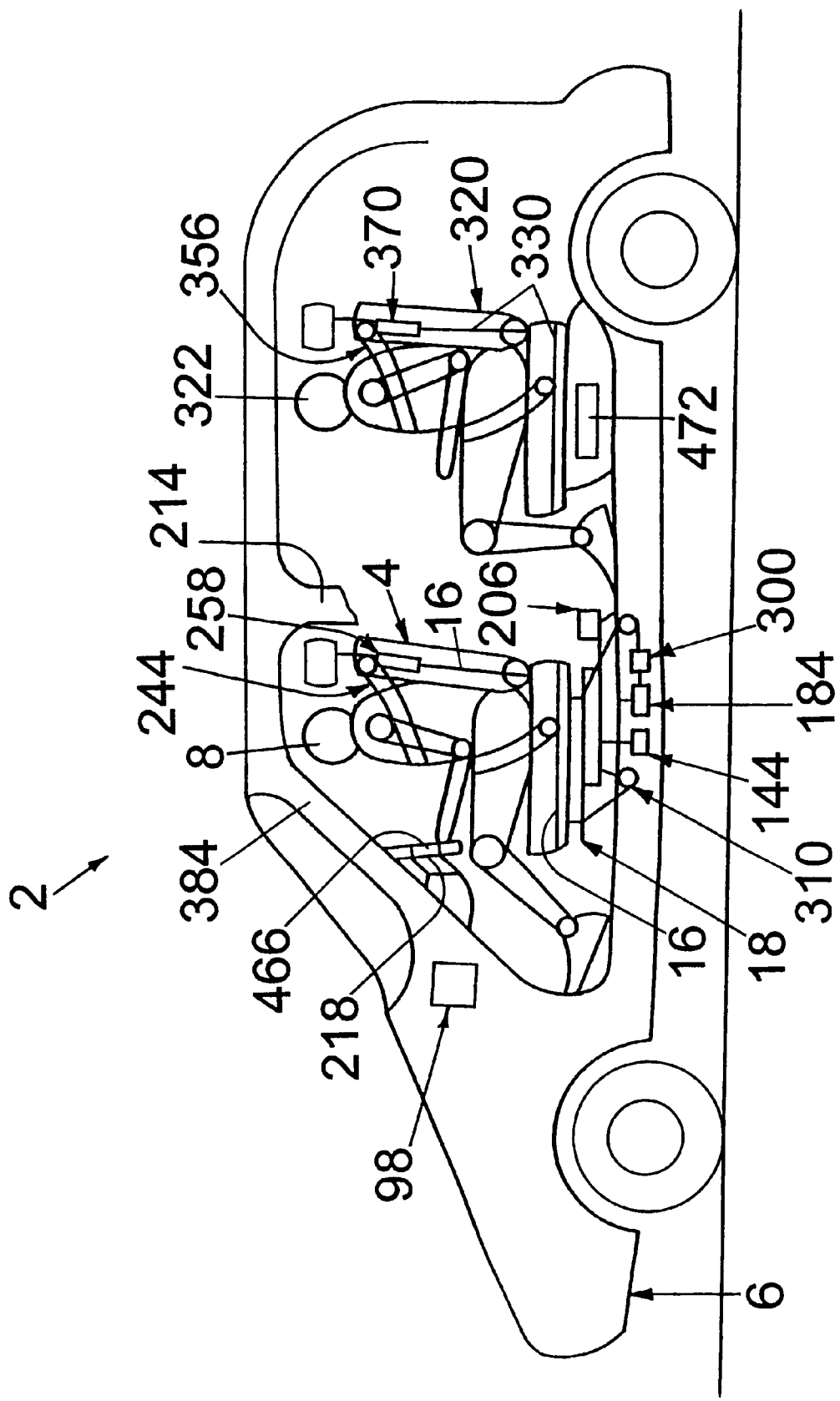
FIG. 1 is a schematic view of the preferred embodiment in accordance with the present invention.

The vehicle occupant emergency system 2 comprises a front vehicle seat 4. The front vehicle seat 4 is mounted in an automotive vehicle 6 for accommodating at least one occupant 8 of the automotive vehicle 6. The front vehicle seat 4 may be any vehicle seat of known type. Although the front vehicle seat 4 is shown for simplicity as a single vehicle seat, the front vehicle seat 4 may be a bench vehicle seat for accommodating more than one occupant of the automotive vehicle 6. Although the front vehicle seat 4 is shown as a driver's seat, the front vehicle seat 4 may be a passenger's seat. The front vehicle seat 4 preferably comprises: a seat cushion 10; a seat back 12 preferably adjustable with respect to the seat cushion 10; a head restraint 14 preferably adjustable with respect to the seat back 12 (FIG. 18); and a seat frame 16 (FIG. 1).

The vehicle occupant emergency system 2 also comprises horizontal adjusting means 18. The horizontal adjusting means 18 may comprise a vehicle horizontal manual seat adjuster of known type. A vehicle horizontal manual seat adjuster typically comprises a pair of parallel tracks mounted to the vehicle and to the seat. The tracks are locked to maintain the seat at its horizontal adjustment or opened to allow the seat to be moved to a new horizontal adjustment. The tracks are generally locked by a pair of rotatable lock bars, one associated with each track and having locking teeth which engage apertures under the force of a return spring. One lock bar, called master lock bar, is directly operated and rotated by a manual handle, while the other, called slave lock bar, is indirectly operated in tandem with the master lock bar by a cross wire running from the master lock bar to the slave lock bar so that both lock bars are fully locked when the handle is released and fully opened when the handle is rotated. Some vehicle horizontal manual seat adjusters comprise an inertia locking device for automatically re-locking the tracks in the event of a vehicle collision during a horizontal adjustment of the seat.

Figure 2:
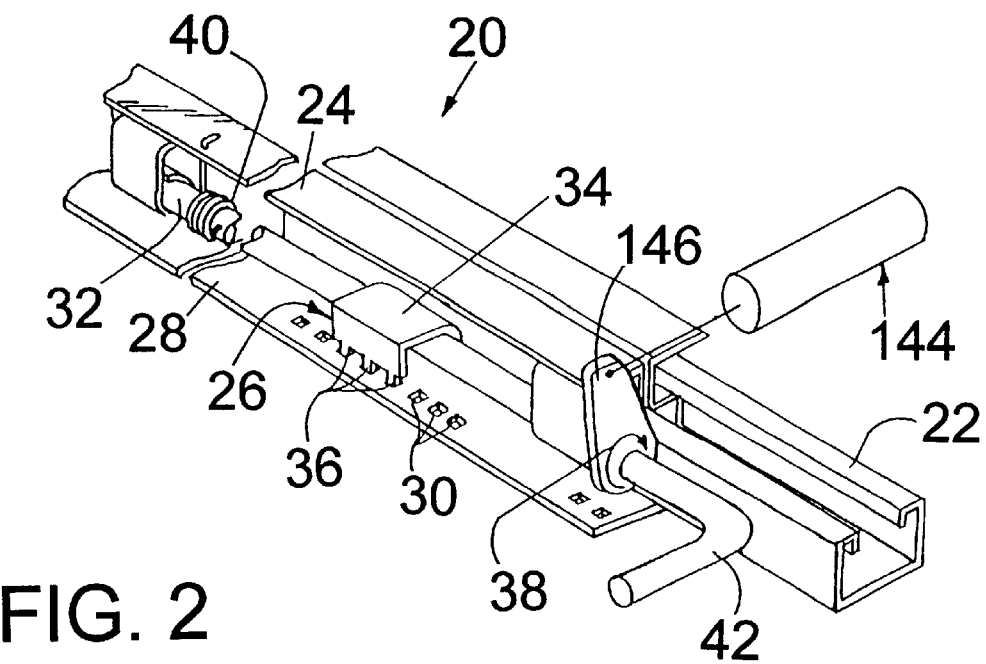
FIG. 2 is a schematic view illustrating a track of a vehicle horizontal manual seat adjuster.

For example, referring to FIG. 2, a track 20 of a vehicle horizontal manual seat adjuster of known type, which carries a master lock bar, is disclosed. The track 20 comprises a lower rail 22 which is mounted to the automotive vehicle 6. An upper rail 24 is slidably mounted to the lower rail 22 for horizontal movement thereon. A riser (not shown) extends upward from the upper rail 24 for mounting the front vehicle seat 4 thereon. A latch mechanism 26 holds the upper rail 24 in a given position relative to the lower rail 22. The latch mechanism 26 comprises a latch plate 28 attached to the lower rail 22. The latch plate 28 has an array of apertures 30. A lock bar 32 is rotatably mounted to the upper rail 24 and carries a latch pawl 34. The latch pawl 34 has a plurality of teeth 36 which are sized to be received within the apertures 30. The latch pawl 34 is movable between a locked position and an opened position by rotating the lock bar 32. In the locked position, the teeth 36 extend into the apertures 30 and thus they hold the upper rail 24 in a fixed position relative to the lower rail 22. By rotating the lock bar 32 in the direction of the arrow 38, the latch pawl 34 is moved to the opened position in which the teeth 36 are withdrawn from the apertures 30. A return spring 40 is coupled with one end to the lock bar 32 and with the other end to the upper rail 24. The return spring 40 biases the lock bar 32 and the latch pawl 34 into the locked position of the latch pawl 34. The front portion of the lock bar 32 is extended and bent to form a handle 42. By rotating the handle 42 in the direction of the arrow 38, the lock bar 32 is rotated in opposition to the return spring 40 to withdraw the teeth 36 of the latch pawl 34 from the apertures 30 in the latch plate 28. With the latch pawl 34 in the opened position, the upper rail 24 is free to move relative to the lower rail 22, and thus the front vehicle seat 4 can be horizontally adjusted relative to the automotive vehicle 6. Although not shown, the track 20 may comprise sliders, rollers, balls or other similar members for smoothing the movement of the upper rail 24 on the lower rail 22. Thus the horizontal adjusting means 18 provides the front vehicle seat 4 with a multiplicity of horizontal adjustments relative to the automotive vehicle 6 and maintains the front vehicle seat 4 at each one of the multiplicity of horizontal adjustments.

The horizontal adjusting means 18 may comprise a vehicle horizontal power seat adjuster of known type. A vehicle horizontal power seat adjuster typically comprises a pair of parallel tracks mounted to the vehicle and to the seat. Each track typically comprises: a lower rail mounted to the vehicle; an upper rail movable on the lower rail and carrying the seat thereon; a screw shaft held by one of the lower rail and upper rail; and a nut held by the other of the lower rail and upper rail and in threaded engagement with the screw shaft. A common bidirectional electric motor drives or turns either one of the screw shaft and nut through a speed reduction gear box at each track. A wire harness extends between the electric motor and an electric power source. Upon energizing of the electric motor, the relative displacement between the screw shaft and the nut causes movement of the upper rail relative to the lower rail at each track. With this, the seat is moved to a new horizontal adjustment relative to the vehicle. Some vehicle horizontal power seat adjusters comprise one screw shaft and one nut.

Figure 3:
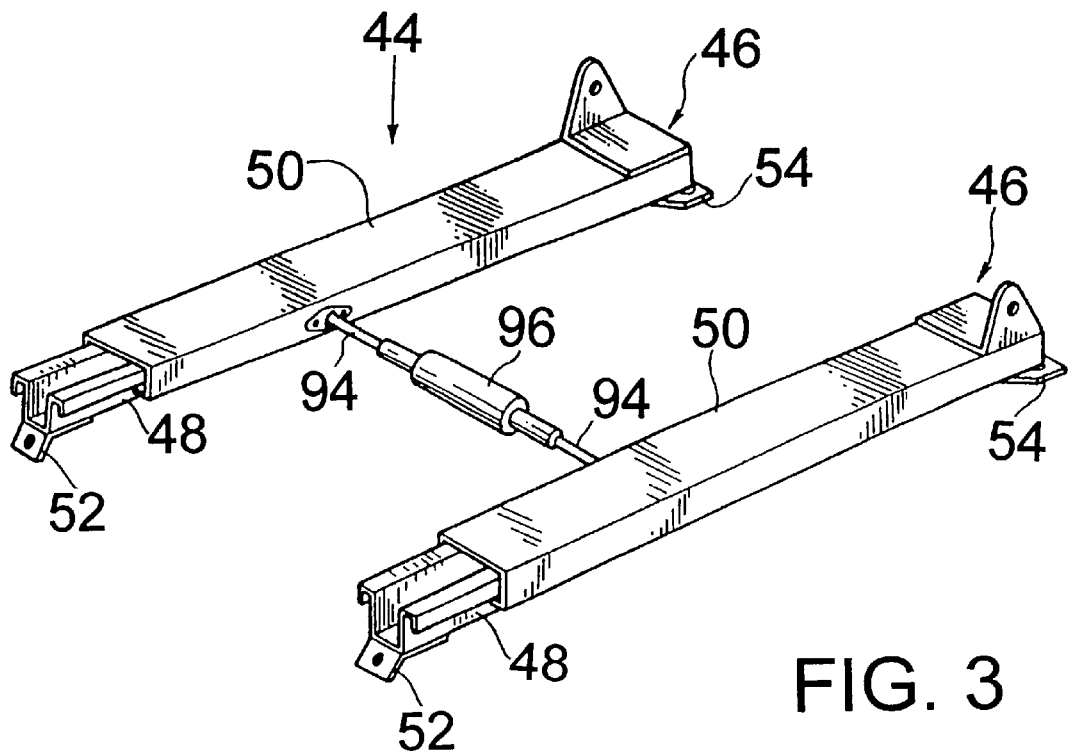
FIG. 3 is a perspective view illustrating a vehicle horizontal power seat adjuster.
Figure 4:
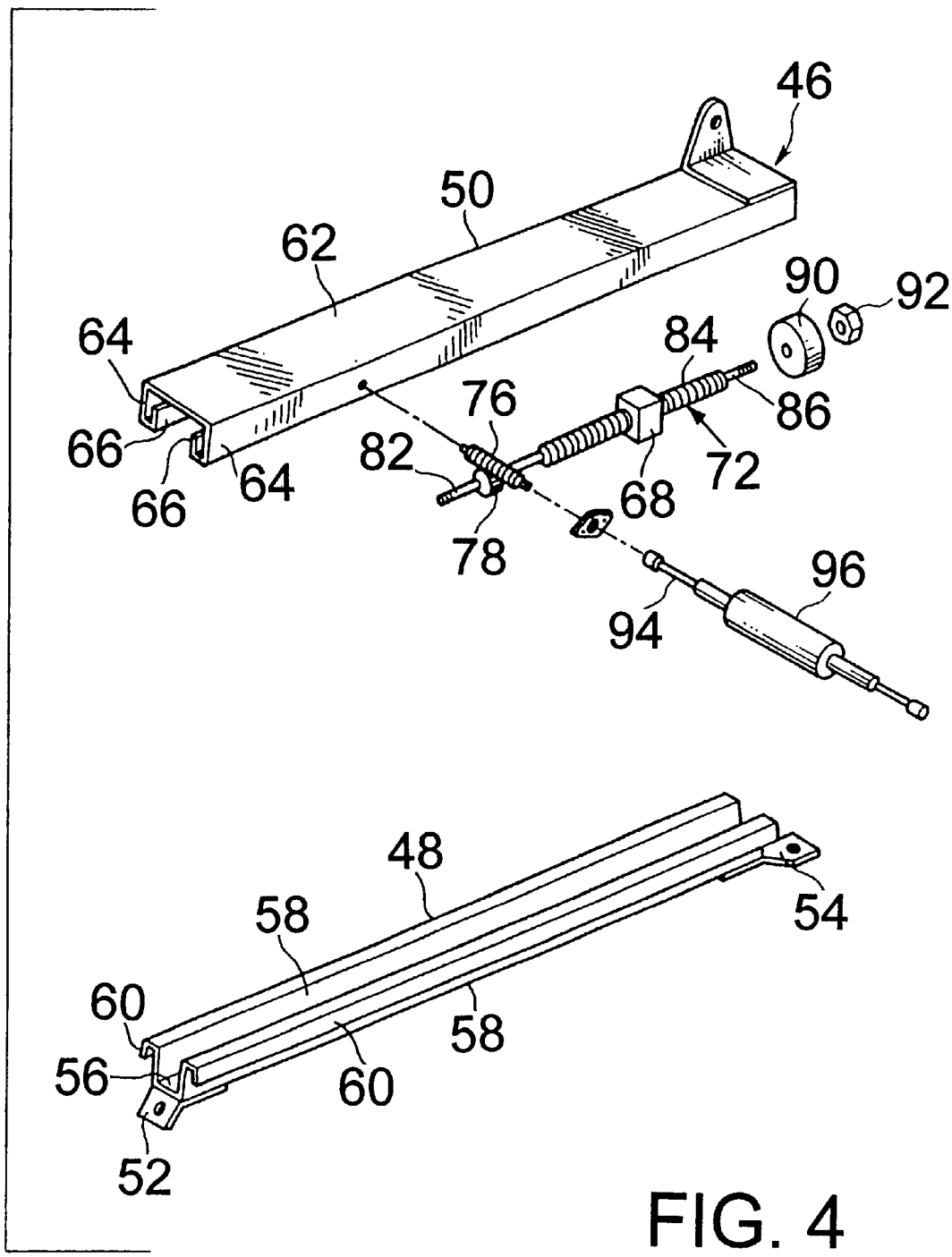
FIG. 4 is an exploded perspective view illustrating the vehicle horizontal power seat adjuster.
Figure 5:
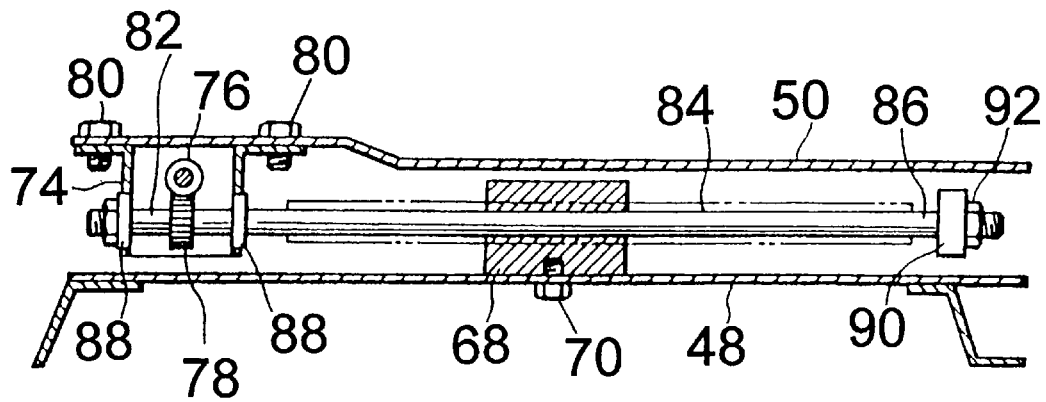
FIG. 5 is a longitudinal cross-sectional view illustrating the assembled vehicle horizontal power seat adjuster.

For example, referring to FIGS. 3–5, a vehicle horizontal power seat adjuster 44 of known type is disclosed. The vehicle horizontal power seat adjuster 44 comprises a pair of parallel tracks 46. Since both tracks 46 have substantially the same construction, only one of the tracks 46 is disclosed in detail. The track 46 comprises a lower rail 48 and an upper rail 50. The lower rail 48 is mounted to the automotive vehicle 6 through brackets 52 and 54 by bolts (not shown). The upper rail 50 is slidably fitted to the lower rail 48 and carries the front vehicle seat 4 thereon. The lower rail 48 includes a bottom wall section 56, a pair of side wall sections 58, and a pair of curved flanges 60. The upper rail 50 includes a substantially flat ceiling wall section 62, a pair of side wall sections 64, and a pair of curved flanges 66. Although not shown, a slider made of synthetic resin may be provided between the mating surface of the curved flanges 60 and 66 for smoothing the movement of the upper rail 50 relative to the lower rail 48. For the same purpose the track 46 may comprise rollers, balls or other similar members. A driving mechanism for the track 46 is provided in an aperture defined between the slidably fitted rails 48 and 50. The driving mechanism comprises: a nut 68 mounted onto the bottom wall section 56 of the lower rail 48 by a bolt 70; a screw shaft 72 in threaded engagement with the nut 68; and a gear box 74. The gear box 74 operably accommodates a worm 76 and a worm wheel 78 engaged with the worm 76. The gear box 74 is secured to the ceiling wall section 62 of the upper rail 50 by bolts 80. The screw shaft 72 has front and rear male-screw ends, a front non-threaded section 82, a middle threaded section 84, and a rear non-threaded section 86. The front non-threaded section 82 is rotatably supported by a pair of bearings 88 attached to the front and rear walls of the gear box 74. The worm wheel 78 is formed integral with the front non-threaded section 82. A substantially cylindrical elastomeric member 90 is secured to the rearmost end of the rear non-threaded section 86 by a fastener 92 for suppressing fluttering of the rear end of the screw shaft 72 during operation of the driving mechanism. The input shaft of the worm 76 is connected to an output drive shaft 94 of a bidirectional electric drive motor 96.

When the drive motor 96 is deactivated, the non-rotated worm 76 restricts the rotational movement of the worm wheel 78 and thus the rotational movement of the screw shaft 72 is prevented. Under this condition, a relative sliding movement of the upper rail 50 to the lower rail 48 is prevented and a horizontal movement of the front vehicle seat 4 relative to the automotive vehicle 6 is prevented as well. When the drive motor 96 is activated, the worm 76 is rotated by the drive shaft 94 and simultaneously the worm wheel 78 is rotated with a relatively large reduction ratio. Thus the screw shaft 72 is rotated to cause a relative displacement to the nut 68. As a result, the upper rail 50, which carries the front vehicle seat 4 thereon, is moved with respect to the lower rail 48 which is mounted to the automotive vehicle 6. In this manner the front vehicle seat 4 can be horizontally adjusted depending on the rotational direction of the drive motor 96. Thus the horizontal adjusting means 18 provides the front vehicle seat 4 with a multiplicity of horizontal adjustments relative to the automotive vehicle 6 and maintains the front vehicle seat 4 at each one of the multiplicity of horizontal adjustments.

The vehicle occupant emergency system 2 also comprises system controlling means 98 (FIG. 1). The system controlling means 98 may be any control unit of known type which is capable of operating the vehicle occupant emergency system 2. The system controlling means 98 preferably comprises a microcomputer.

Figure 7:
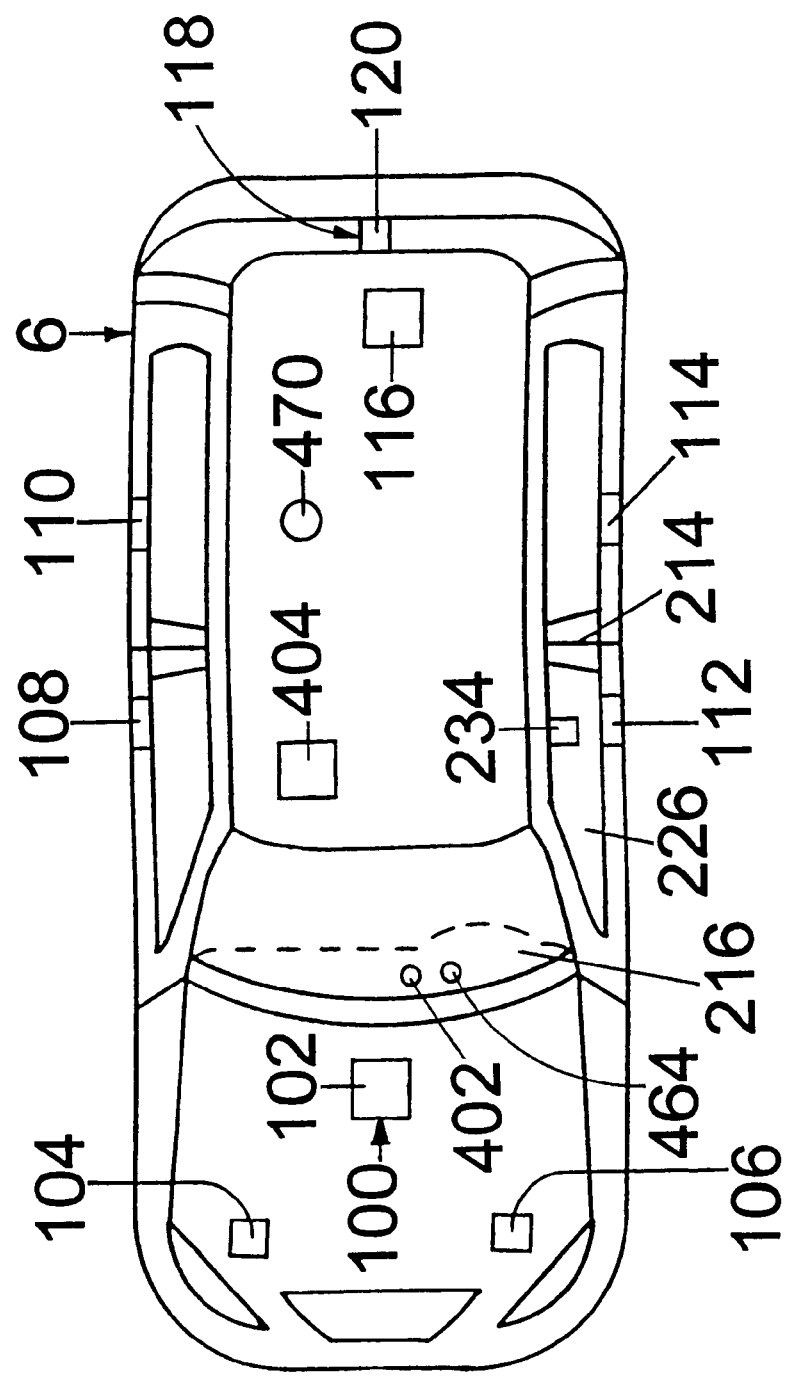
FIG. 7 is a schematic view illustrating first sensing means and rear sensing means.

The vehicle occupant emergency system 2 also comprises first sensing means 100 (FIG. 7). The first sensing means 100 may comprise any one or more crash sensors of known type which are: suitably mounted to the automotive vehicle 6; electrically connected to the system controlling means 98; capable of sensing characteristics of a front-end/front-angular vehicle collision, such as a severity level and direction of the impact; and capable of providing signals to the system controlling means 98 indicative of the sensed characteristics. Each front-end/front-angular crash sensor may have a different or variable crash severity level.

The first sensing means 100 may also comprise any one or more crash sensors of known type which are: suitably mounted to the automotive vehicle 6; electrically connected to the system controlling means 98; capable of sensing characteristics of a side-end vehicle collision, such as a severity level and direction of the impact; and capable of providing signals to the system controlling means 98 indicative of the sensed characteristics.

Each side-impact crash sensor may have a different or variable crash severity level.

The first sensing means 100 may also comprise any one or more rollover crash sensors of known type which are: suitably mounted to the automotive vehicle 6; electrically connected to the system controlling means 98; capable of sensing vehicle rollover conditions; and capable of providing signals to the system controlling means 98 indicative of the sensed vehicle rollover conditions.

The first sensing means 100 may additionally or alternatively comprise any one or more sensing devices of known type, such as radar/laser sensors for example, which are: suitably mounted to the automotive vehicle 6; electrically connected to the system controlling means 98; capable of sensing characteristics of a front-end/front-angular vehicle collision and/or of a side-end vehicle collision, such as a severity level and direction of the impact before it actually happens; and capable of providing signals to the system controlling means 98 indicative of the sensed characteristics.

The first sensing means 100 preferably comprises: front-end/front-angular crash sensors 102, 104 and 106; side-impact crash sensors 108, 110, 112 and 114; and a rollover crash sensor 116.

It should be understood that, if desired, the first sensing means 100 may comprise only one or more front-end/front-angular crash sensors and/or one or more radar/laser sensors of known type.

The vehicle occupant emergency system 2 also comprises rear sensing means 118 (FIG. 7). The rear sensing means 118 may comprise any one or more crash sensors of known type which are: suitably mounted to the automotive vehicle 6; electrically connected to the system controlling means 98; capable of sensing characteristics of a rear-end vehicle collision, such as a severity level and direction of the impact; and capable of providing signals to the system controlling means 98 indicative of the sensed characteristics. Each rear-end crash sensor may have a different or variable crash severity level.

The rear sensing means 118 may additionally or alternatively comprise any one or more sensing devices of known type which are: suitably mounted to the automotive vehicle 6; electrically connected to the system controlling means 98; capable of sensing characteristics of a rear-end vehicle collision, such as a severity level and direction of the impact before it actually happens; and capable of providing signals to the system controlling means 98 indicative of the sensed characteristics.

The rear sensing means 118 preferably comprises a rear-impact crash sensor 120.

Figure 8:
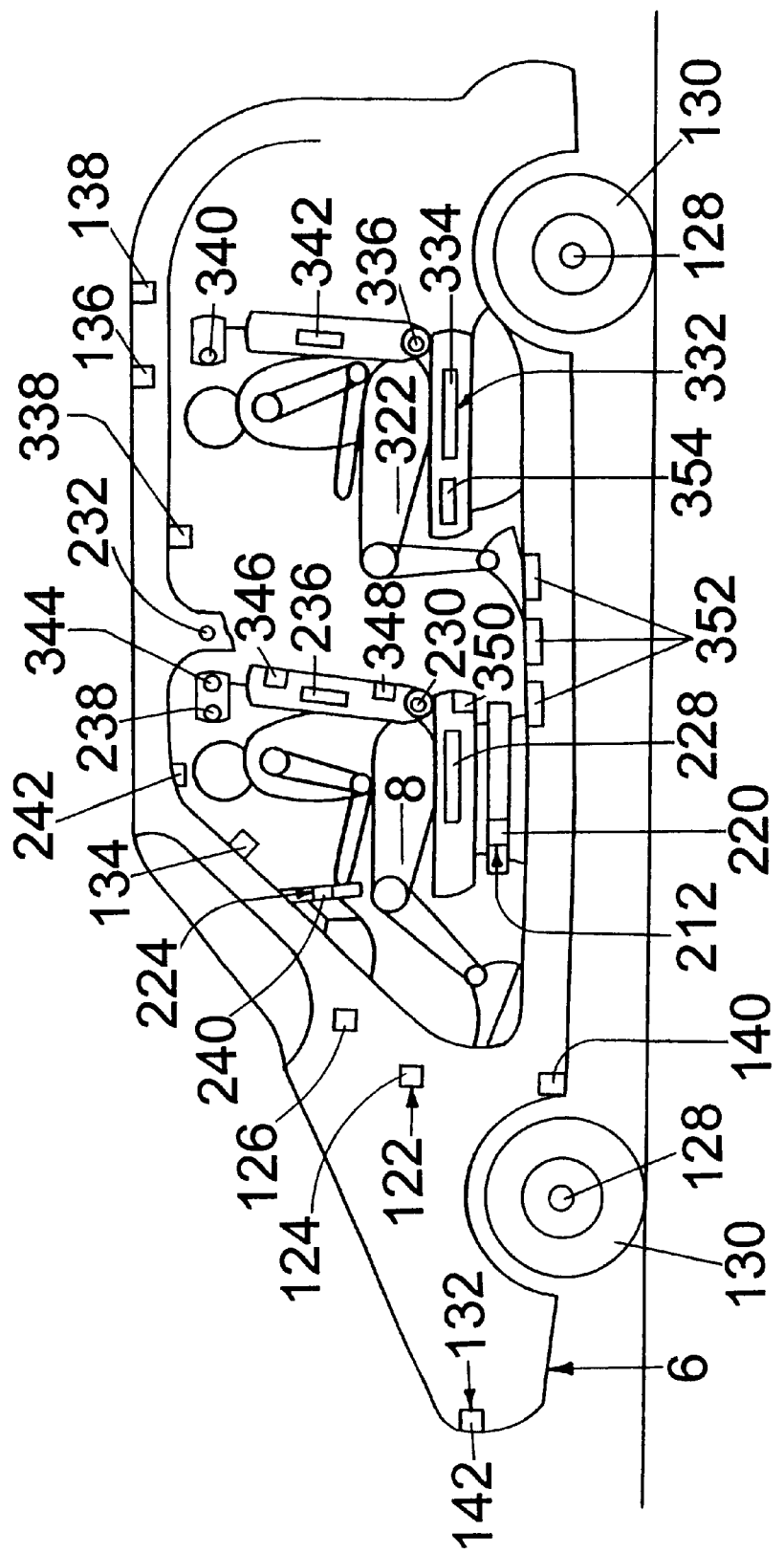
FIG. 8 is a schematic view illustrating second sensing means, third sensing means, fourth sensing means, fifth sensing means, and seventh sensing means.

The vehicle occupant emergency system 2 also comprises second sensing means 122 (FIG. 8). The second sensing means 122 may comprise any one or more sensing devices of known type which are: suitably mounted; electrically connected to the system controlling means 98; capable of sensing characteristics of the automotive vehicle 6, such as vehicle speed, engine speed and road wheel speed; and capable of providing signals to the system controlling means 98 indicative of the sensed characteristics.

The second sensing means 122 preferably comprises a vehicle speed sensor 124, an engine speed sensor 126, and a road wheel sensor 128 for each road wheel 130 (only two are shown) in order the system controlling means 98 to be assisted by the second sensing means 122 in a known manner in determining the existence of a vehicle collision and its severity level.

The vehicle occupant emergency system 2 also comprises third sensing means 132 (FIG. 8). The third sensing means 132 may comprise any one or more sensing devices of known type which are: suitably mounted; electrically connected to the system controlling means 98; capable of sensing characteristics of the environment inside and outside of the automotive vehicle 6, such as inside temperature, outside temperature and slippery conditions (wet/rain/snow/ice); and capable of providing signals to the system controlling means 98 indicative of the sensed characteristics.

The third sensing means 132 preferably comprises: an inside temperature sensor 134; an outside temperature sensor 136; and slippery condition sensors 138, 140 and 142.

Figure 9:
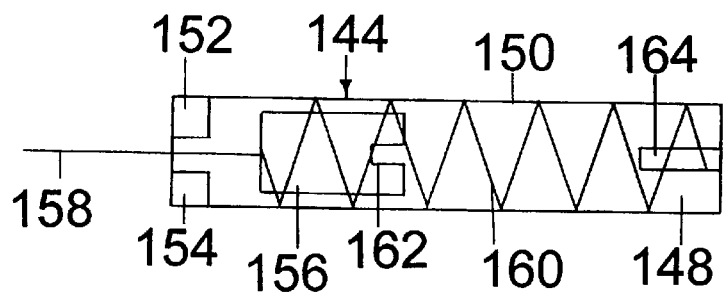
FIG. 9 is a schematic view illustrating an actuator of releasing means.
Figure 10:
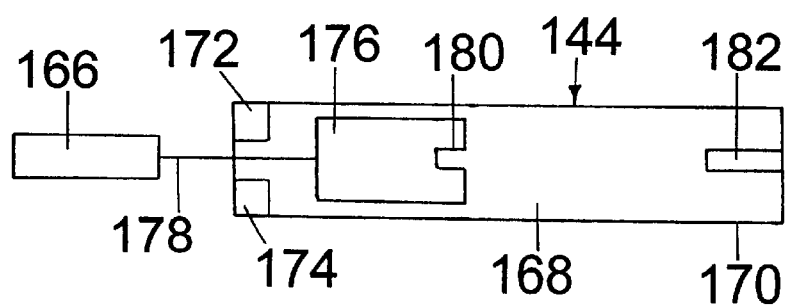
FIG. 10 is a schematic view illustrating other actuator of the releasing means.

The vehicle occupant emergency system 2 also comprises releasing means 144 (FIGS. 2, 9 and 10). It should be understood that, if the horizontal adjusting means 18 comprises a vehicle horizontal manual seat adjuster of known type, depending on the specific construction of the vehicle horizontal manual seat adjuster, the releasing means 144 may comprise any one or more actuators of known type which are: suitably mounted; capable of allowing the front vehicle seat 4 to be adjusted to each one of the multiplicity of horizontal adjustments before a vehicle collision; electrically connected to the system controlling means 98; operable by the system controlling means 98; and capable of releasing the front vehicle seat 4 from its pre-emergency horizontal adjustment in the event of a vehicle collision so that the front vehicle seat 4 can be moved rearward relative to its pre-emergency horizontal adjustment.

For example, in this case the releasing means 144 may comprise: one or more solenoid actuators having an extensible and retractable plunger; one or more actuators of a pressurized fluid container-cylinder-piston-locking member type, each actuator being connected to a spring loaded spool which has a connecting member of known type wound thereon and suitably attached to the vehicle horizontal manual seat adjuster; one or more actuators of a pressurized fluid container-cylinder-spring loaded piston-locking member type; one or more pyrotechnic actuators of a gas generator-cylinder-piston-locking member type, each pyrotechnic actuator being connected to a spring loaded spool which has a connecting member of known type wound thereon and suitably attached to the vehicle horizontal manual seat adjuster; one or more actuators of a gas generator-cylinder-spring loaded piston-locking member type; and/or one or more actuators of a gas generator-cylinder-spring loaded piston type.

Depending on the specific construction of the vehicle horizontal manual seat adjuster comprised by the horizontal adjusting means 18 and depending on the type of the actuator/actuators comprised by the releasing means 144, the releasing means 144 may be mounted in different places and may be connected to the horizontal adjusting means 18 directly or through one or more transmitting/connecting members of known type.

For example, if the horizontal adjusting means 18 comprises the track 20 and another identical track (not shown), the releasing means 144 may be connected to the handle 42 to rotate the lock bar 32 in the direction of the arrow 38 so as to move the latch pawl 34 from the locked position to the opened position in the event of a vehicle collision so that the front vehicle seat 4 can be moved rearward relative to its pre-emergency horizontal adjustment.

For another example, the releasing means 144 may be connected to the latch pawl 34 so as to move the latch pawl 34 from the locked position to the opened position in the event of a vehicle collision so that the front vehicle seat 4 can be moved rearward relative to its pre-emergency horizontal adjustment.

For a further example, a vehicle horizontal manual seat adjuster of the type of the vehicle horizontal manual seat adjuster comprising the track 20, which carries the master lock bar 32, and another identical track (not shown) which carries the slave lock bar, may be adapted to enable the front vehicle seat 4 to be released from its pre-emergency horizontal adjustment by the releasing means 144, so that the front vehicle seat 4 can be moved rearward relative to its pre-emergency horizontal adjustment in the event of a vehicle collision, by fixing a pivot lever 146 to the master lock bar 32. The releasing means 144 may be connected to the pivot lever 146 so as to rotate the pivot lever 146 in the direction of the arrow 38 and thus to move the latch pawl 34 from the locked position to the opened position.

If the horizontal adjusting means 18 comprises the track 20 and another identical track (not shown), the releasing means 144 preferably comprises a pyrotechnic actuator 148 which is a gas generator-cylinder-spring loaded piston-locking member type and which preferably has at least two different pyrotechnic propellant charges which can be ignited individually or together at the same time by the system controlling means 98. The pyrotechnic actuator 148 is preferably mounted to a plate (not shown) which is secured to the upper rail 24. The pyrotechnic actuator 148 preferably comprises: a cylinder 150; two different pyrotechnic propellant charges 152 and 154; a piston 156 preferably connected to the pivot lever 146 by a wire cable 158; a spring 160 which maintains the wire cable 158 in a generally taut condition during a horizontal adjustment of the front vehicle seat 4; and a locking device of known type for the piston 156, preferably members 162 and 164 which engage each other upon abutting. Upon activation of one or both pyrotechnic propellant charges 152 and 154 by the system controlling means 98 in the event of a vehicle collision, combustion products generated by the pyrotechnic propellant charge 152 and/or by the pyrotechnic propellant charge 154 instantaneously move the piston 156 to the opposite end of the cylinder 150 where the piston 156 is locked by the engaging members 162 and 164. Thus the front vehicle seat 4 is instantaneously released from its pre-emergency horizontal adjustment by the releasing means 144 and can be moved rearward relative to its pre-emergency horizontal adjustment.

It should be understood that, if desired, the pyrotechnic actuator 148 may have only one pyrotechnic propellant charge.

It should be also understood that, if the horizontal adjusting means 18 comprises a vehicle horizontal manual seat adjuster of the type of the vehicle horizontal manual seat adjuster comprising the track 20 and another identical track (not shown), depending on the specific construction of the vehicle horizontal manual seat adjuster and whether it is adapted for the purpose of the present invention, the releasing means 144 may be connected to an operative handle, to one or more latch members, to one or more pivot levers, and/or to one or more other members of known type which are fixed directly or indirectly to the master lock bar or to both lock bars.

It should be further understood that the vehicle horizontal manual seat adjuster comprising the track 20 and another identical track (not shown) is a vehicle horizontal manual seat adjuster of known type and it is an example of one of the most commonly incorporated in the vehicles types of vehicle horizontal manual seat adjusters as well as an example of a way by which it may be adapted, if desired, for the purpose of the present invention.

It should be further understood that the present invention is not limited to a specific type of a vehicle horizontal manual seat adjuster known in the art. It should be further understood that the present invention is not limited to a specific way of adapting a vehicle horizontal manual seat adjuster of known type for the purpose of the present invention.

If the horizontal adjusting means 18 comprises a vehicle horizontal power seat adjuster of the type of the vehicle horizontal power seat adjuster 44, because of the permanent threaded engagement between the screw shaft and the nut at each track, the vehicle horizontal power seat adjuster needs to be adapted to enable the front vehicle seat 4 to be released from its pre-emergency horizontal adjustment by the releasing means 144 so that the front vehicle seat 4 can be moved rearward relative to its pre-emergency horizontal adjustment in the event of a vehicle collision. In general, a vehicle horizontal power seat adjuster of a screw shaft-nut type may be adapted for the purpose of the present invention by removably mounting in a suitable and known manner one of the screw shaft and nut at each track.

It should be understood that, if the horizontal adjusting means 18 comprises a vehicle horizontal power seat adjuster of known type, depending on the specific construction of the vehicle horizontal power seat adjuster and depending on the way by which it is adapted for the purpose of the present invention, the releasing means 144 may comprise any one or more actuators of known type which are: suitably mounted; electrically connected to the system controlling means 98; operable by the system controlling means 98; and capable of releasing the front vehicle seat 4 from its pre-emergency horizontal adjustment in the event of a vehicle collision so that the front vehicle seat 4 can be moved rearward relative to its pre-emergency horizontal adjustment. In addition, if the horizontal adjusting means 18 comprises a vehicle horizontal power seat adjuster which is not a screw shaft-nut type, each actuator comprised by the releasing means 144 should be also capable of allowing the front vehicle seat 4 to be adjusted to each one of the multiplicity of horizontal adjustments before a vehicle collision.

For example, in this case the releasing means 144 may comprise: one or more pyrotechnic charges; one or more solenoid actuators having an extensible and retractable plunger; one or more actuators of a pressurized fluid container-cylinder-piston-locking member type; one or more pyrotechnic actuators of a gas generator-cylinder-piston-locking member type; and/or one or more locking/catching devices of known type deactivated by the system controlling means 98 in the event of a vehicle collision.

Depending on the specific construction of the vehicle horizontal power seat adjuster comprised by the horizontal adjusting means 18 and depending on the type of the actuator/actuators comprised by the releasing means 144, the releasing means 144 may be mounted in different places and may be connected to the horizontal adjusting means 18 directly or through one or more transmitting/connecting members of known type.

For example, if the horizontal adjusting means 18 comprises the vehicle horizontal power seat adjuster 44, because of the permanent threaded engagement between the screw shaft 72 and the nut 68 at each track 46, the vehicle horizontal power seat adjuster 44 needs to be adapted to enable the front vehicle seat 4 to be released from its pre-emergency horizontal adjustment by the releasing means 144 so that the front vehicle seat 4 can be moved rearward relative to its pre-emergency horizontal adjustment in the event of a vehicle collision. For example, the vehicle horizontal power seat adjuster 44 may be adapted for the purpose of the present invention by removably mounting the nut 68 to the lower rail 48 at each track 46. For example, at each track 46 the nut 68 may be removably mounted to the lower rail 48 by replacing the bolt 70 with any one or more removable holding members of known type which are capable of holding the nut 68 in a fixed position and releasing the nut 68 upon a releasing force being applied by the releasing means 144. For another example, at each track 46 the nut 68 may be removably mounted to the lower rail 48 by replacing the bolt 70 with any one or more locking/catching devices of known type which are capable of holding the nut 68 in a fixed position and releasing the nut 68 upon deactivation by the system controlling means 98 or upon a releasing force being applied by the releasing means 144.

For example, the removable holding member may be: a rivet or shear pin loaded with a pyrotechnic charge which is operable by the system controlling means 98; a spring loaded pin or latch mechanism connected to a solenoid actuator, to an actuator of a pressurized fluid container-cylinder-piston-locking member type, or to a pyrotechnic actuator of a gas generator-cylinder-piston-locking member type which is operable by the system controlling means 98; or a pin or detent connected to a solenoid actuator, to an actuator of a pressurized fluid container-cylinder-piston-locking member type, or to a pyrotechnic actuator of a gas generator-cylinder-piston-locking member type which is operable by the system controlling means 98. For example, the catching device may be a clamping device of known type which is operable by the system controlling means 98 or which is suitably connected to the releasing means 144.

Figure 6:
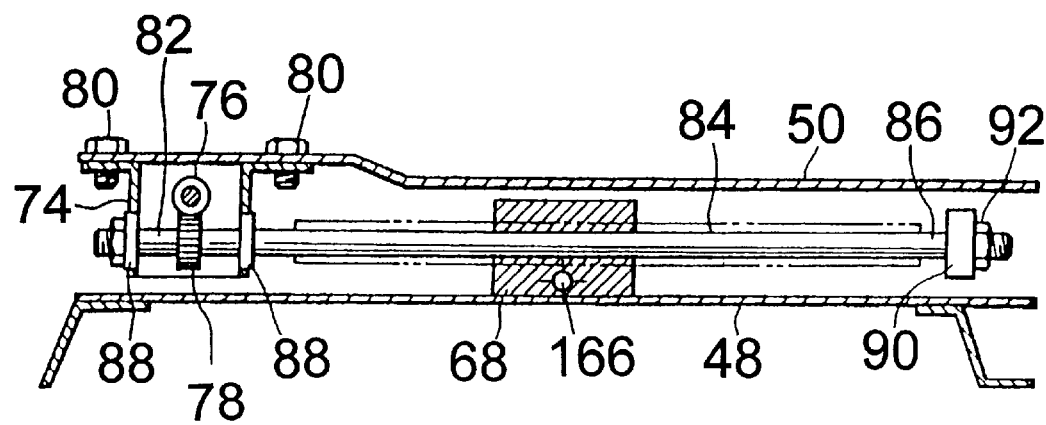
FIG. 6 is a longitudinal cross-sectional view illustrating the adapted vehicle horizontal power seat adjuster.

As shown in FIG. 6, preferably at each track 46 the nut 68 is removably mounted to the lower rail 48 by replacing the bolt 70 with a pin 166 connected to the releasing means 144. At each track 46 the pin 166 is preferably disposed through the nut 68 and the side wall sections 58 at the bottom of the lower rail 48. Thus the pin 166 prevents the nut 68 from moving in a vertical direction. The nut 68 at each track 46 is sized and shaped so that it does not rotate about the screw shaft 72 and it is movable in the rearward direction relative to the automotive vehicle 6 in tandem with the screw shaft 72 upon removal of the pin 166 by the releasing means 144.

If desired, at each track 46 the pin 166 may be disposed in the nut 68 through the bottom wall section 56 of the lower rail 48 and the nut 68 may be sized and shaped so that it has a predetermined vertical movement, it does not rotate about the screw shaft 72, and it is movable in the rearward direction relative to the automotive vehicle 6 in tandem with the screw shaft 72 upon removal of the pin 166 by the releasing means 144.

If desired, at each track 46 the screw shaft 72 may be so attached at its rearmost end to the upper rail 50 by a bracket or other member of known type that it can rotate.

If the horizontal adjusting means 18 comprises the vehicle horizontal power seat adjuster 44, the releasing means 144 preferably comprises two pyrotechnic actuators 168 (only one is shown) which are a gas generator-cylinder-piston-locking member type and which preferably have at least two different pyrotechnic propellant charges which can be ignited individually or together at the same time by the system controlling means 98. Each pyrotechnic actuator 168 is preferably mounted to the automotive vehicle 6 at one of the tracks 46. Each pyrotechnic actuator 168 preferably comprises: a cylinder 170; two different pyrotechnic propellant charges 172 and 174; a piston 176 connected to the pin 166 of the correspondent track 46 by a wire cable 178; and a locking device of known type for the piston 176, preferably members 180 and 182 which engage each other upon abutting. Upon activation of one or both pyrotechnic propellant charges 172 and 174 of each pyrotechnic actuator 168 by the system controlling means 98 in the event of a vehicle collision, combustion products generated by the pyrotechnic propellant charge 172 and/or by the pyrotechnic propellant charge 174 of each pyrotechnic actuator 168 instantaneously move the correspondent piston 176 to the opposite end of the correspondent cylinder 170 where the correspondent piston 176 is locked by the correspondent engaging members 180 and 182. Thus the pins 166 (only one is shown) are instantaneously removed from the nuts 68 (only one is shown) and from the side wall sections 58 at both tracks 46 and the upper rail 50 of each track 46 can be moved rearward relative to the correspondent lower rail 48. Thus the front vehicle seat 4 is instantaneously released from its pre-emergency horizontal adjustment by the releasing means 144 and can be moved rearward relative to its pre-emergency horizontal adjustment.

It should be understood that, if desired, each pyrotechnic actuator 168 may have only one pyrotechnic propellant charge.

It should be also understood that the vehicle horizontal power seat adjuster 44 is a vehicle horizontal power seat adjuster of known type and it is an example of one of the most commonly incorporated in the vehicles types of vehicle horizontal power seat adjusters as well as an example of a way by which it may be adapted for the purpose of the present invention.

It should be further understood that the present invention is not limited to a specific type of a vehicle horizontal power seat adjuster known in the art. It should be further understood that the present invention is not limited to a specific way of adapting a vehicle horizontal power seat adjuster of known type for the purpose of the present invention.

Figure 11:
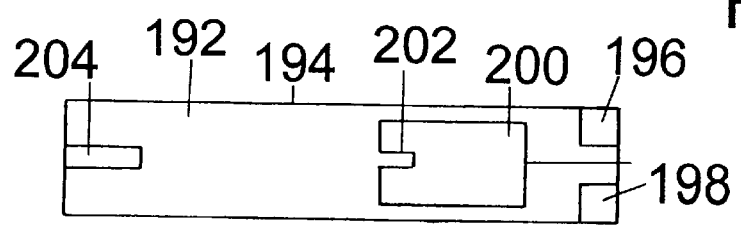
FIG. 11 is a schematic view illustrating an actuator of moving means.
Figure 12:
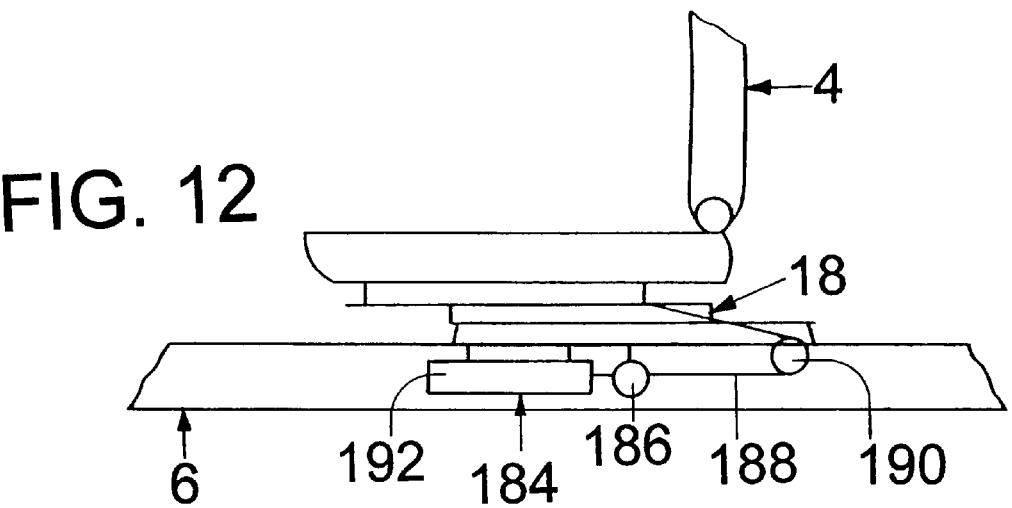
FIG. 12 is a schematic view illustrating the moving means.

The vehicle occupant emergency system 2 also comprises moving means 184 (FIGS. 11 and 12). The moving means 184 may comprise any one or more actuators of known type which are: suitably mounted; capable of allowing the front vehicle seat 4 to be adjusted to each one of the multiplicity of horizontal adjustments before a vehicle collision; electrically connected to the system controlling means 98; operable by the system controlling means 98; and capable of moving the front vehicle seat 4 rearward relative to its pre-emergency horizontal adjustment in the event of a vehicle collision after the front vehicle seat 4 has been released from its pre-emergency horizontal adjustment by the releasing means 144.

For example, the moving means 184 may comprise: one or more solenoid actuators having an extensible and retractable plunger; one or more actuators of a pressurized fluid container-cylinder-spring loaded piston type; one or more actuators of a pressurized fluid container-cylinder-spring loaded piston-locking member type; one or more pyrotechnic actuators of a gas generator-cylinder-spring loaded piston type; one or more pyrotechnic actuators of a gas generator-cylinder-spring loaded piston-locking member type; and/or one or more of the aforementioned actuators but each actuator being connected in a known manner to a spring loaded spool which has a connecting member of known type wound thereon and suitably attached to the front vehicle seat 4.

Depending on the specific construction of the horizontal adjusting means 18 and depending on the type of the actuator/actuators comprised by the moving means 184, the moving means 184 may be mounted in different places and may be connected to the front vehicle seat 4 directly or through one or more transmitting/connecting members of known type.

At each track of the horizontal adjusting means 18 the moving means 184 preferably comprises: a spring loaded spool 186 mounted to the automotive vehicle 6 and having a wire cable 188 wound thereon and attached through a pulley 190 to the rear end of the upper rail of the correspondent track of the horizontal adjusting means 18; and a pyrotechnic actuator 192 which is a gas generator-cylinder-piston-locking member type and which preferably has at least two different pyrotechnic propellant charges which can be ignited individually or together at the same time by the system controlling means 98, the pyrotechnic actuator 192 is mounted to the automotive vehicle 6 and is connected in a known manner to the spring loaded spool 186. The moving means 184 is preferably located under the floor area of the automotive vehicle 6.

Each pyrotechnic actuator 192 (only one is shown) preferably comprises: a cylinder 194; two different pyrotechnic propellant charges 196 and 198; a piston 200 connected in a known manner to the correspondent spring loaded spool 186; and a locking device of known type for the piston 200, preferably members 202 and 204 which engage each other upon abutting. Each spring loaded spool 186 (only one is shown) maintains the correspondent wire cable 188 wound thereon in a generally taut condition during a horizontal adjustment of the front vehicle seat 4. Upon activation of one or both pyrotechnic propellant charges 196 and 198 of each pyrotechnic actuator 192 by the system controlling means 98 in the event of a vehicle collision, combustion products generated by the pyrotechnic propellant charge 196 and/or by the pyrotechnic propellant charge 198 of each pyrotechnic actuator 192 instantaneously move the correspondent piston 200 to the opposite end of the correspondent cylinder 194 where the correspondent piston 200 is locked by the correspondent engaging members 202 and 204. Thus each wire cable 188 (only one is shown) is instantaneously rewound on the correspondent spring loaded spool 186 and the front vehicle seat 4, which has been released from its pre-emergency horizontal adjustment by the releasing means 144, is instantaneously moved rearward relative to its pre-emergency horizontal adjustment by the moving means 184.

It should be understood that, if desired, each pyrotechnic actuator 192 may have only one pyrotechnic propellant charge.

Figure 13:
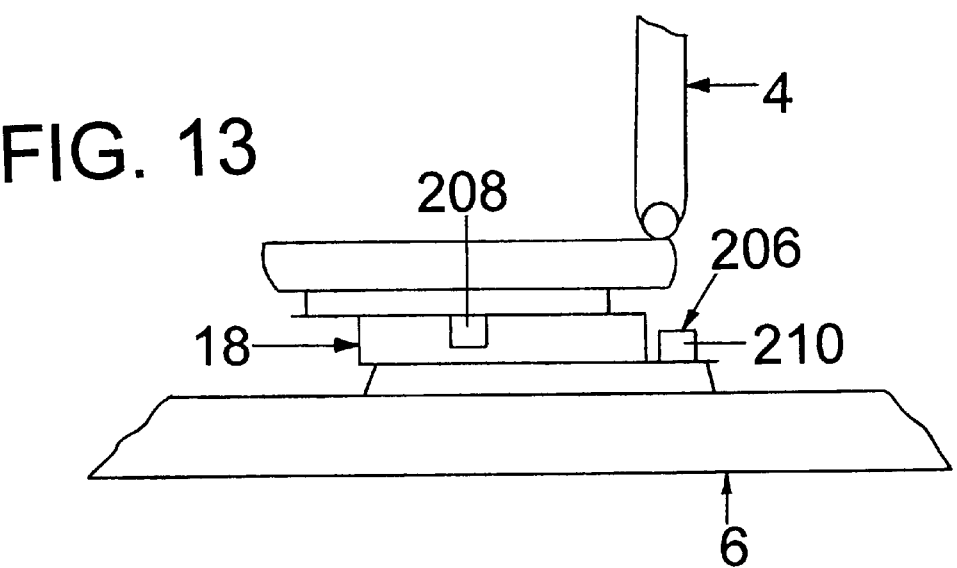
FIG. 13 is a schematic view illustrating stopping means.

The vehicle occupant emergency system 2 also comprises stopping means 206 (FIGS. 1 and 13). The stopping means 206 may comprise any one or more members of known type or any one or more pairs of engaging members of known type which are suitably mounted and which are capable of controlling a maximum extent to which the front vehicle seat 4 can be moved rearward relative to its pre-emergency horizontal adjustment by the moving means 184 in the event of a vehicle collision.

For example, each member of known type may be mounted to the automotive vehicle 6 behind the front vehicle seat 4 so that it engages one or both upper rails of the horizontal adjusting means 18 or it engages the seat frame 16.

For example, each pair of engaging members of known type may comprise a first member mounted to the lower rail inside of one of the tracks of the horizontal adjusting means 18 and a second member mounted to the upper rail inside of the same track so that it engages the first member.

For another example, each pair of engaging members of known type may comprise: a first member mounted to the automotive vehicle 6 or to the lower rail outside of one of the tracks of the horizontal adjusting means 18; and a second member mounted to the upper rail outside of the same track or to the seat frame 16 so that it engages the first member.

At each track of the horizontal adjusting means 18 the stopping means 206 preferably comprises a bumper 208 mounted to the upper rail and a dashpot 210 mounted to the lower rail so that it engages the bumper 208 as soon as the front vehicle seat 4 is moved to its predetermined rearmost extent which is the maximum extent to which the front vehicle seat 4 can be moved rearward relative to its pre-emergency horizontal adjustment by the moving means 184 in the event of a vehicle collision. At each track of the horizontal adjusting means 18 the bumper 208 and the dashpot 210 are preferably side-mounted outside of the track so that they do not occupy space from the floor area of the automotive vehicle 6 behind the front vehicle seat 4.

Figure 15:
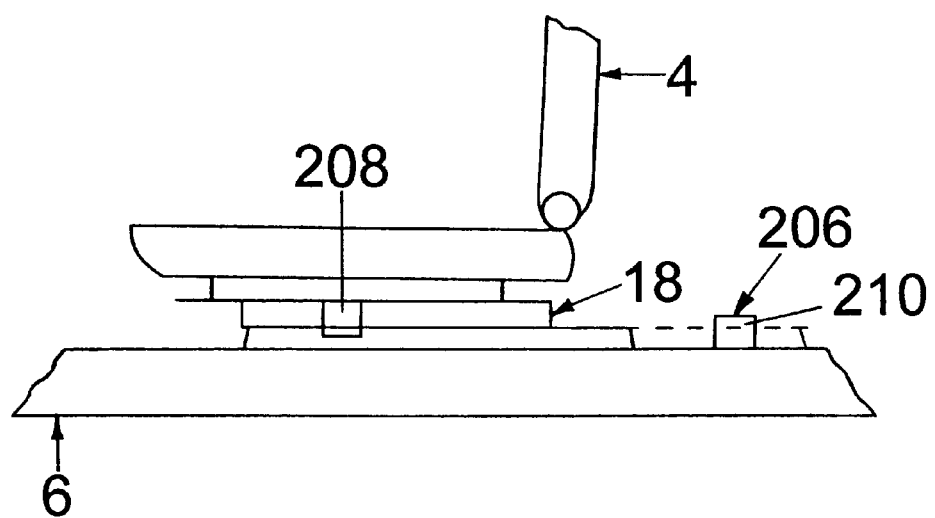
FIG. 15 is a schematic view illustrating the stopping means and horizontal adjusting means having extended lower rails.
Figure 16:
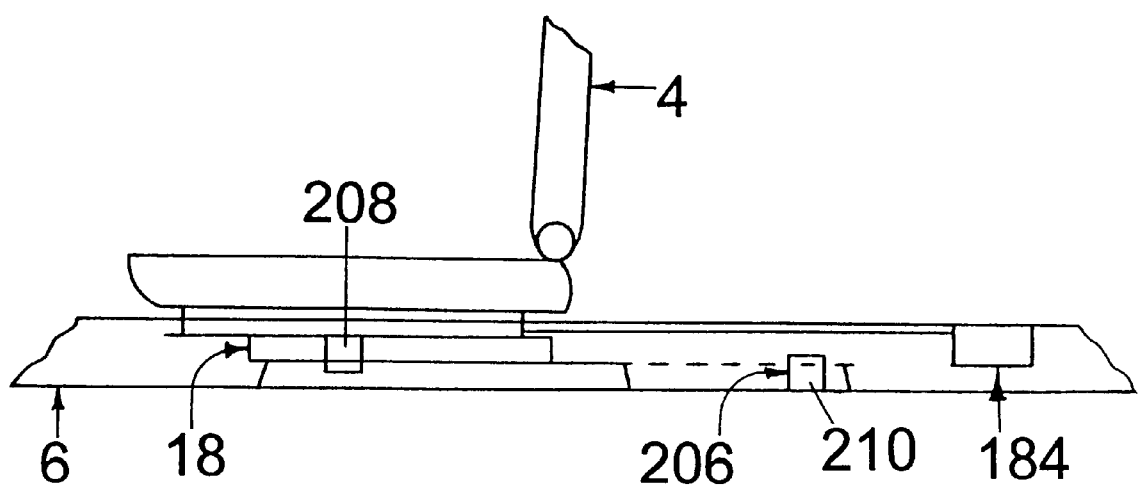
FIG. 16 is a schematic view illustrating the moving means, the stopping means, and the horizontal adjusting means having extended lower rails.

Depending on the specific construction of the horizontal adjusting means 18 and depending on the location of the stopping means 206 relative to the horizontal adjusting means 18, the horizontal adjusting means 18 may be adapted to enable the front vehicle seat 4 to be moved to the stopping means 206 by the moving means 184 in the event of a vehicle collision by extending the lower rail of each track, as shown with dotted lines in FIGS. 15 and 16.

If the horizontal adjusting means 18 comprises a vehicle horizontal power seat adjuster of known type, depending on the specific construction of the vehicle horizontal power seat adjuster and depending on the distance between the stopping means 206 and the rearmost horizontal adjustment of the front vehicle seat 4, the wire harness, which extends between the drive motor and the electric power source, may be connected to the drive motor so that it is disengaged from the drive motor as soon as the front vehicle seat 4 is moved rearward farther from a predetermined point.

In order the horizontal adjusting means 18 not to occupy space from the floor area of the automotive vehicle 6 behind the front vehicle seat 4, the lower rail or both rails of each track of the horizontal adjusting means 18 may be located under the floor area of the automotive vehicle 6, as shown in FIG. 16. For the same purpose, the lower rail of one of the tracks of the horizontal adjusting means 18 may be mounted to the rocker panel of the automotive vehicle 6 and the lower rail of the other track may be mounted to the transmission tunnel of the automotive vehicle 6. The moving means 184 also may be mounted to the rocker panel and/or to the transmission tunnel of the automotive vehicle 6, or it may be mounted under the floor area of the automotive vehicle 6, as shown in FIG. 16.

Figure 14:
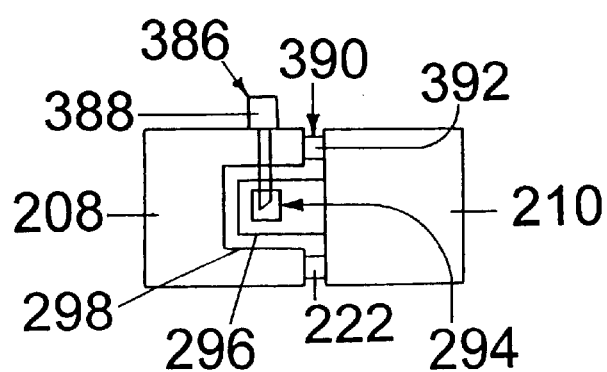
FIG. 14 is a schematic view illustrating second restraining means, stop sensing means, and second releasing means.

The vehicle occupant emergency system 2 also comprises fourth sensing means 212 (FIGS. 8 and 14). The fourth sensing means 212 may comprise any one or more sensing devices of known type which are: suitably mounted; electrically connected to the system controlling means 98; capable of sensing characteristics of the front vehicle seat 4, such as the moment in which the front vehicle seat 4 is moved to the stopping means 206, a current relative position of a point, preferably the rear end of the seat cushion 10, to a B-pillar 214, a current distance from a point, preferably the rear end of the seat cushion 10, to the B-pillar 214, a current distance from a point, preferably the front end of the seat cushion 10, to a dashboard 216 or to a steering wheel 218, and a current distance from the pre-emergency horizontal adjustment of the front vehicle seat 4 to the stopping means 206 as well as to the rearmost horizontal adjustment of the front vehicle seat 4, if it is not the maximum extent; and capable of providing signals to the system controlling means 98 indicative of the sensed characteristics.

The fourth sensing means 212 preferably comprises: a seat position sensor 220 for sensing the distance from a current horizontal adjustment of the front vehicle seat 4 to the stopping means 206 as well as for sensing the distance from any position of the front vehicle seat 4 along the tracks of the horizontal adjusting means 18 to the stopping means 206; and a stop sensor 222 for sensing the front vehicle seat 4 as soon as it is moved to the stopping means 206.

Preferably, in its internal memory the system controlling means 98 has: the dimensions of the front vehicle seat 4; the relative position of the B-pillar 214 to the stopping means 206 and to the dashboard 216 or to the steering wheel 218; the dimensions of the B-pillar 214; the distance from the stopping means 206 to the B-pillar 214; the distance from the stopping means 206 to the dashboard 216 or to the steering wheel 218; and the distance from the stopping means 206 to the rearmost horizontal adjustment of the front vehicle seat 4, if it is not the maximum extent. After calculations in a known manner based on the sensed distance by the seat position sensor 220, the system controlling means 98 determines: the distance from the pre-emergency horizontal adjustment of the front vehicle seat 4 to the stopping means 206 as well as to the rearmost horizontal adjustment of the front vehicle seat 4, if it is not the maximum extent; the current relative position of the front vehicle seat 4 to the B-pillar 214; the current distance from the front vehicle seat 4 to the B-pillar 214; and the current distance from the front vehicle seat 4 to the dashboard 216 or to the steering wheel 218.

It should be understood that the seat position sensor 220 and the stop sensor 222 may be replaced with any one or more suitable sensing devices of known type and the characteristics of the front vehicle seat 4 may be sensed on the base of the same or different physical measurement principles and the system controlling means 98 may provide suitable calculations.

The vehicle occupant emergency system 2 also comprises fifth sensing means 224 (FIGS. 7 and 8). The fifth sensing means 224 may comprise any one or more sensing devices of known type which are: suitably mounted; electrically connected to the system controlling means 98; capable of sensing characteristics of the at least one occupant 8 in the front vehicle seat 4, such as weight, height, and position including a current relative position to the B-pillar 214 and to a side window opening 226 as well as a current distance to the B-pillar 214, to the side window opening 226, and to the dashboard 216 or to the steering wheel 218; and capable of providing signals to the system controlling means 98 indicative of the sensed characteristics.

If the front vehicle seat 4 is a single vehicle seat, the fifth sensing means 224 preferably comprises: a weight sensor 228; a seat-back angle sensor 230; a B-pillar sensor 232; a side window opening sensor 234; occupant position sensors 236, 238 and 240; and a height sensor 242.

Based on the received signals from the weight sensor 228 and from the seat-back angle sensor 230 and based on its internal memory and programming the system controlling means 98 calculates in a known manner the weight of the occupant 8 in the front vehicle seat 4.

Preferably, in its internal memory the system controlling means 98 also has the dimensions and the relative position of the side window opening 226 to the dashboard 216 or to the steering wheel 218. Based on the received signals from the B-pillar sensor 232, from the side window opening sensor 234, from the occupant position sensors 236, 238 and 240, and from the fourth sensing means 212, and based on its internal memory and programming the system controlling means 98 determines: the current relative position of the occupant 8 in the front vehicle seat 4 to the B-pillar 214 and to the side window opening 226; and the current distance from the occupant 8 in the front vehicle seat 4 to the B-pillar 214, to the side window opening 226, and to the dashboard 216 or to the steering wheel 218.

It should be understood that the characteristics of the at least one occupant 8 in the front vehicle seat 4, such as weight, height and position, may be sensed on the base of different physical measurement principles and the system controlling means 98 may provide suitable calculations.

Figure 17:
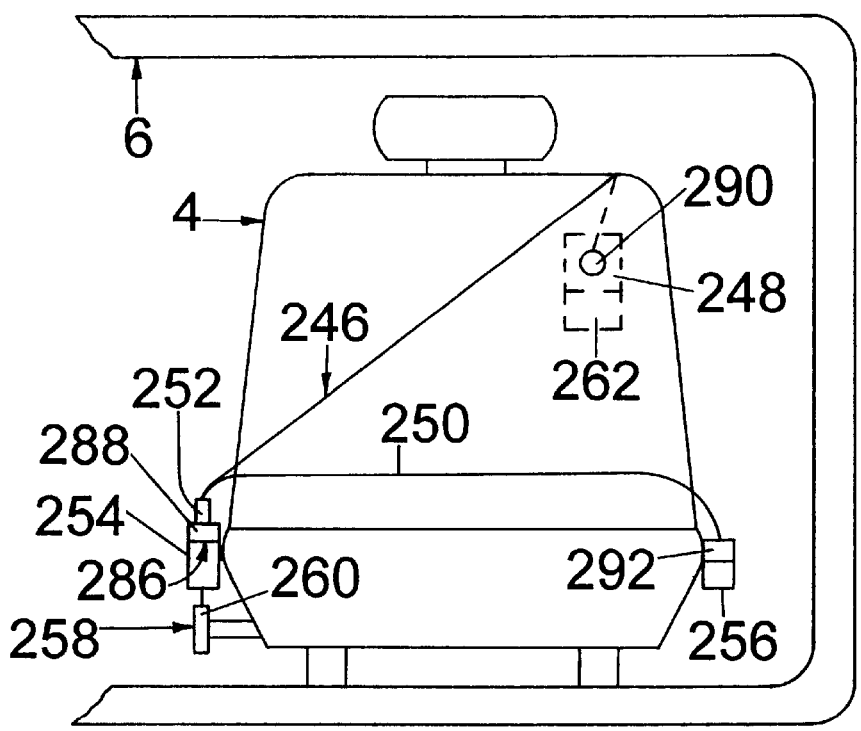
FIG. 17 is a schematic view illustrating a front vehicle seat, first restraining means, first pretensioning means, and sixth sensing means.
Figure 18:
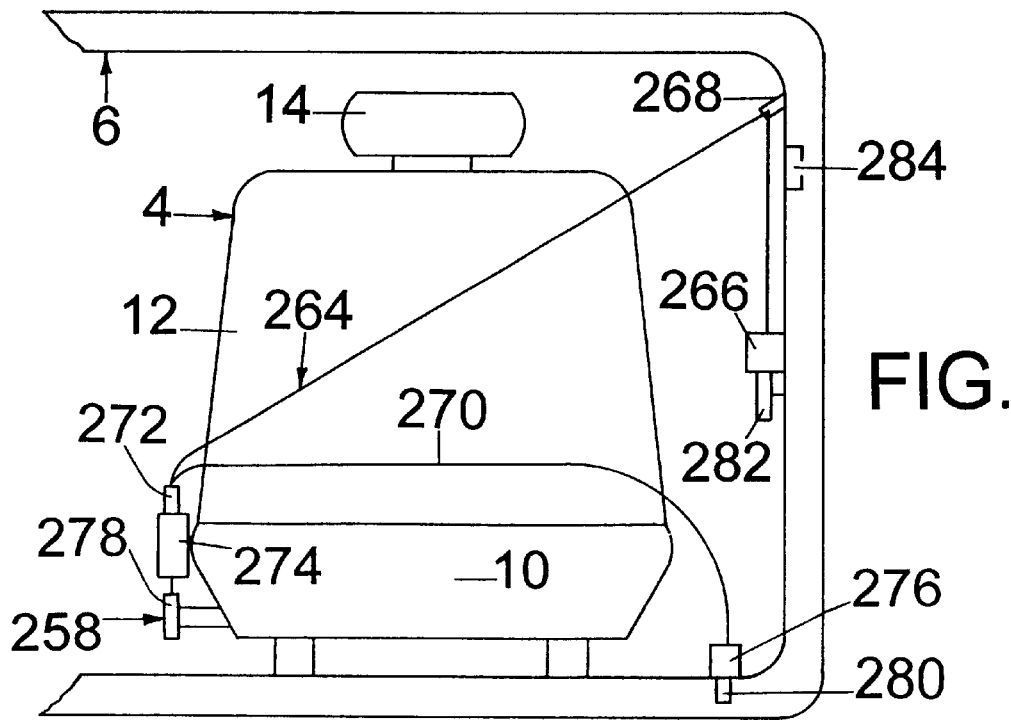
FIG. 18 is a schematic view illustrating the front vehicle seat, the first restraining means, and the first pretensioning means.
Figure 19:
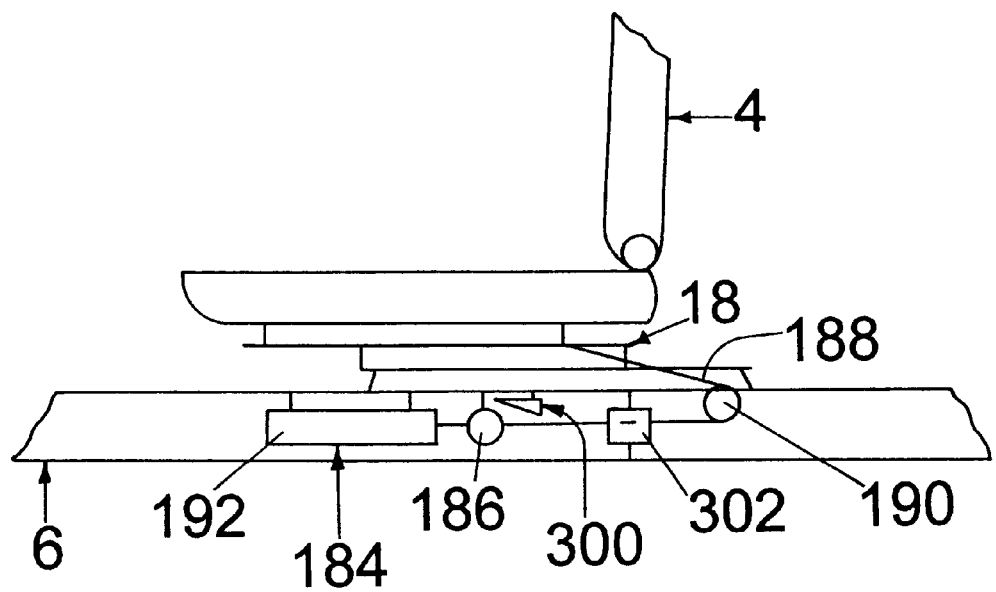
FIG. 19 is a schematic view illustrating the moving means and locking means.
Figure 20:
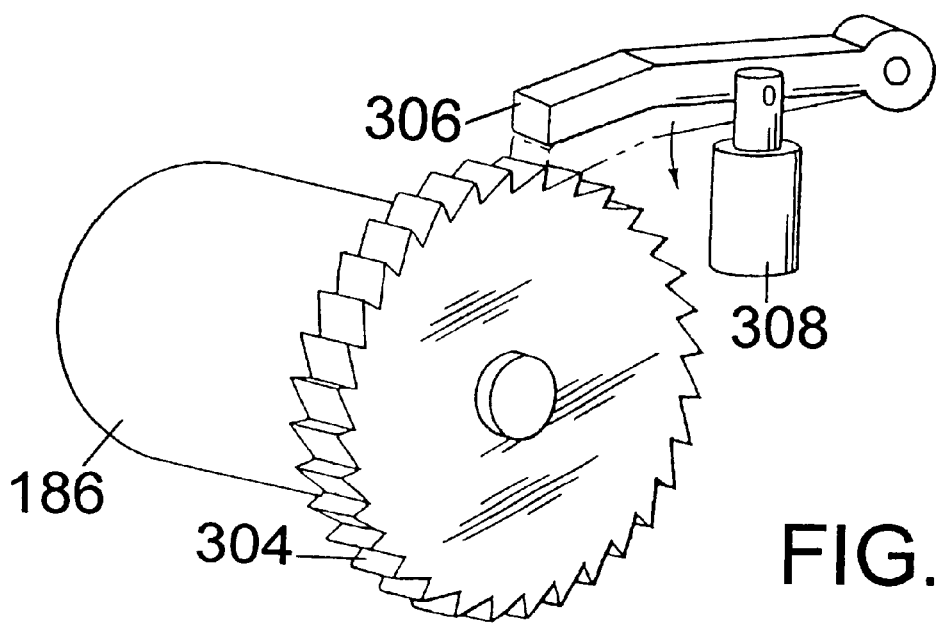
FIG. 20 is a schematic view illustrating the locking means.

The vehicle occupant emergency system 2 also comprises first restraining means 244 (FIGS. 1, 17 and 18). Depending on the type of the front vehicle seat 4, the first restraining means 244 may comprise any one or more seat-belt systems of known type which are capable of restraining the at least one occupant 8 in the front vehicle seat 4 in the event of a vehicle collision in which the front vehicle seat 4 should be moved rearward relative to its pre-emergency horizontal adjustment for protection of the at least one occupant 8 in the front vehicle seat 4.

If the front vehicle seat 4 is a single vehicle seat, the first restraining means 244 preferably comprises a seat-integrated seat-belt system 246 of known type including an emergency locking retractor 248, a seat-belt webbing 250, an insertion tongue 252, a seat-belt buckle 254, and an anchor 256.

The first restraining means 244 also comprises first pretensioning means 258 (FIGS. 1, 17 and 18) for further restraining the at least one occupant 8 in the front vehicle seat 4. Depending on the number and type of the seat-belt systems comprised by the first restraining means 244, the first pretensioning means 258 may comprise any one or more belt-pretensioning devices of known type which are: suitably mounted; electrically connected to the system controlling means 98; operable by the system controlling means 98; and capable of removing regular belt-slack, which exists under normal driving conditions, and/or capable of removing additional belt-slack which may occur as a result of being the front vehicle seat 4 moved rearward relative to its pre-emergency horizontal adjustment in the event of a vehicle collision. The first pretensioning means 258 preferably comprises multistage pyrotechnic belt-pretensioning device/devices having an integrated force limiter.

If the first restraining means 244 comprises the seat-integrated seat-belt system 246, the first pretensioning means 258 preferably comprises a buckle belt-pretensioning device 260 of known type for removing regular belt-slack. The buckle belt-pretensioning device 260 preferably is a multistage pyrotechnic belt-pretensioning device having an integrated force limiter and having at least two different pyrotechnic propellant charges which can be ignited individually or together at the same time by the system controlling means 98. If desired, in this case the first pretensioning means 258 instead of the buckle belt-pretensioning device 260 may comprise a retractor belt-pretensioning device 262 for removing regular belt-slack. If further desired, in this case the first pretensioning means 258 may comprise a buckle belt-pretensioning device 260 and a retractor belt-pretensioning device 262 in order the regular belt-slack to be jointly removed by both belt-pretensioning devices 260 and 262.

It should be understood that, if desired, each belt-pretensioning device comprised by the first pretensioning means 258 may have only one pyrotechnic propellant charge or it may be of other suitable type.

If the first restraining means 244 comprises a seat-belt system having at least one of its points mounted to the automotive vehicle 6, in the event of a vehicle collision, in which the front vehicle seat 4 should be moved rearward relative to its pre-emergency horizontal adjustment, the at least one point (shoulder-retractor, seat-belt buckle, and/or anchor/lap-retractor), which is not mounted to the front vehicle seat 4, becomes a source of belt-slack, called additional belt-slack, which occurs as a result of the rearward moving front vehicle seat 4 relative to the automotive vehicle 6 and which should be removed in order the at least one occupant 8 to be restrained to the front vehicle seat 4.

For example, if the front vehicle seat 4 is a single vehicle seat and if the first restraining means 244 comprises a conventional three-point seat-belt system 264 which includes a shoulder-retractor 266 mounted to the automotive vehicle 6, a height adjusting guide 268 mounted to the automotive vehicle 6, a seat-belt webbing 270, an insertion tongue 272, a seat-belt buckle 274 mounted to the front vehicle seat 4, and an anchor/lap-retractor 276 mounted to the automotive vehicle 6, in the event of a vehicle collision, in which the front vehicle seat 4 should be moved rearward relative to its pre-emergency horizontal adjustment, there will be regular belt-slack, which exists under normal driving conditions, and additional belt-slack, which occurs as a result of the rearward moving front vehicle seat relative to the automotive vehicle 6 and as a result of being the shoulder-retractor 266 and the anchor/lap-retractor 276 mounted to the automotive vehicle 6.

For example, if the first restraining means 244 comprises the seat-belt system 264, the first pretensioning means 258 may comprise: a buckle belt-pretensioning device 278 or an anchor/lap-retractor belt-pretensioning device 280 for removing one of the regular and additional belt-slack; and a shoulder-retractor belt-pretensioning device 282 or a height adjusting guide belt-pretensioning device 284 for removing the other of the regular and additional belt-slack.

For another example, if the first restraining means 244 comprises the seat-belt system 264, the first pretensioning means 258 may comprise a buckle belt-pretensioning device 278 or a shoulder-retractor belt-pretensioning device 282 for removing all the belt-slack, including regular and additional belt-slack.

For a still another example, if the first restraining means 244 comprises the seat-belt system 264, the regular belt-slack and/or the additional belt-slack may be jointly removed by at least two belt-pretensioning devices. For example, in this case the first pretensioning means 258 may comprise: a buckle belt-pretensioning device 278 and a height adjusting guide belt-pretensioning device 284 for jointly removing one of the regular and additional belt-slack; and a shoulder-retractor belt-pretensioning device 282 and an anchor/lap-retractor belt-pretensioning device 280 for jointly removing the other of the regular and additional belt-slack.

Depending on the number and type of the seat-belt systems comprised by the first restraining means 244 and depending on the number and type of the belt-pretensioning devices comprised by the first pretensioning means 258 for removing regular belt-slack and/or additional belt-slack, the first pretensioning means 258 may also comprise one or more back-up belt-pretensioning devices of known type which are kept in reserve for further removing regular belt-slack and/or additional belt-slack.

For example, if the first restraining means 244 comprises the seat-integrated seat-belt system 246, the first pretensioning means 258 may comprise a buckle belt-pretensioning device 260 for removing regular belt-slack and a back-up retractor belt-pretensioning device 262 kept in reserve for further removing regular belt-slack.

For another example, if the first restraining means 244 comprises the seat-belt system 264, the first pretensioning means 258 may comprise: a buckle belt-pretensioning device 278 for removing regular belt-slack; a shoulder-retractor belt-pretensioning device 282 for removing additional belt-slack; a back-up anchor/lap-retractor belt-pretensioning device 280 kept in reserve for further removing regular belt-slack; and a back-up height adjusting guide belt-pretensioning device 284 kept in reserve for further removing additional belt-slack.

It should be understood that the present invention is not limited to the disclosed examples of the first restraining means 244 and of the first pretensioning means 258 for removing regular belt-slack and/or additional belt-slack.

The vehicle occupant emergency system 2 also comprises sixth sensing means 286 (FIG. 17). The sixth sensing means 286 may comprise any one or more sensing devices of known type which are: suitably mounted; electrically connected to the system controlling means 98; capable of sensing characteristics of the first restraining means 244, such as shoulder-belt tension, lap-belt tension, and whether the first restraining means 244 is in use; and capable of providing signals to the system controlling means 98 indicative of the sensed characteristics.

For example, depending on the number and type of the seat-belt systems comprised by the first restraining means 244, the sixth sensing means 286 may comprise one or more buckle sensors, shoulder-belt tension sensors, and lap-belt tension sensors of known type.

If the first restraining means 244 comprises the seat-integrated seat-belt system 246, the sixth sensing means 286 preferably comprises a buckle sensor 288, a shoulder-belt tension sensor 290, and a lap-belt tension sensor 292.

The vehicle occupant emergency system 2 also comprises second restraining means 294 (FIG. 14). The second restraining means 294 may comprise any one or more locking devices/arrangements of known type having one or more pairs of engaging members of known type which are suitably mounted and which are capable of restraining the front vehicle seat 4 from moving forward after the front vehicle seat 4 has been moved rearward relative to its pre-emergency horizontal adjustment by the moving means 184.

For example, each pair of engaging members of known type may comprise a first member mounted to the lower rail inside of one of the tracks of the horizontal adjusting means 18 and a second member mounted to the upper rail inside of the same track so that it engages the first member.

For another example, each pair of engaging members of known type may comprise: a first member mounted to the automotive vehicle 6 or to the lower rail outside of one of the tracks of the horizontal adjusting means 18; and a second member mounted to the seat frame 16 or to the upper rail outside of the same track so that it engages the first member.

If the moving means 184 comprises one or more actuators of a cylinder-piston type, the second restraining means 294 may additionally or alternatively comprise any one or more locking devices of known type which are capable of engaging the piston in a known manner and/or biting the interior of the cylinder of the correspondent actuator. For example, the second restraining means 294 may also comprise one or more locking ellipses and/or members which engage each other upon abutting.

The second restraining means 294 preferably comprises two pairs of engaging male-female members of known type, preferably of a seat-belt buckle-insertion tongue type. Each male-member 296 (only one is shown) is preferably mounted to one of the dashpots 210 (only one is shown) and each female-member 298 (only one is shown) is preferably mounted to one of the bumpers 208 (only one is shown) so that it engages the correspondent male-member 296 as soon as the front vehicle seat 4 is moved to the stopping means 206 by the moving means 184.

If at each track of the horizontal adjusting means 18 the moving means 184 comprises one of the pyrotechnic actuators 192, as it is preferred, the second restraining means 294 preferably also comprises the engaging members 202 and 204 of each pyrotechnic actuator 192.

The vehicle occupant emergency system 2 also comprises locking means 300 (FIGS. 1, 19 and 20) for preventing the front vehicle seat 4 from moving forward after the front vehicle seat 4 has been moved rearward relative to its pre-emergency horizontal adjustment by the moving means 184.

If the moving means 184 is connected to the front vehicle seat 4 directly or by one or more connecting members of known type, the locking means 300 may comprise any one or more devices of known type which are: suitably mounted; electrically connected to the system controlling means 98; operable by the system controlling means 98; and capable of preventing a correspondent connecting member or plunger/piston of an actuator comprised by the moving means 184 from moving.

If the moving means 184 comprises one or more spring loaded spools having a connecting member of known type wound thereon and suitably attached to the front vehicle seat 4, the locking means 300 may comprise any one or more devices of known type which are: suitably mounted; electrically connected to the system controlling means 98; operable by the system controlling means 98; capable of preventing a correspondent spring loaded spool from rotating in the forward direction relative to the automotive vehicle 6 or from rotating in both directions; and/or capable of preventing a correspondent connecting member from moving.

If at each track of the horizontal adjusting means 18 the moving means 184 comprises the pyrotechnic actuator 192 connected to the spring loaded spool 186 which has the wire cable 188 wound thereon and attached through the pulley 190 to the rear end of the upper rail of the correspondent track of the horizontal adjusting means 18, as it is preferred, the locking means 300 at each track of the horizontal adjusting means 18 preferably comprises: a clamping device 302 of known type, which is electrically connected to the system controlling means 98 and which is operable by the system controlling means 98, for preventing the correspondent wire cable 188 from moving upon clamping; a ratchet wheel 304 mounted to the correspondent spring loaded spool 186; a lock pawl 306 for locking the correspondent ratchet wheel 304 so that the correspondent spring loaded spool 186 is prevented from rotating in the forward direction relative to the automotive vehicle 6; and a solenoid actuator 308, which is electrically connected to the system controlling means 98 and which is operable by the system controlling means 98, for actuating the correspondent lock pawl 306.

It should be understood that the present invention is not limited to the disclosed arrangement for the locking means 300 and the locking means 300 may comprise any suitable arrangement of devices of known type.

The vehicle occupant emergency system 2 also comprises preventing means 310 (FIGS. 1 and 21). The preventing means 310 may comprise any one or more devices of known type which are: suitably mounted; capable of allowing the front vehicle seat 4 to be adjusted to each one of the multiplicity of horizontal adjustments before a vehicle collision; electrically connected to the system controlling means 98; operable by the system controlling means 98; and capable of preventing the front vehicle seat 4 from moving further rearward after the front vehicle seat 4 has been moved rearward relative to its pre-emergency horizontal adjustment by the moving means 184 but not to the stopping means 206.

Depending on the specific construction of the horizontal adjusting means 18 and depending on the type of the device/devices comprised by the preventing means 310, the preventing means 310 may be mounted in different places and may be connected to the front vehicle seat 4 directly or through one or more transmitting/connecting members of known type.

At each track of the horizontal adjusting means 18 the preventing means 310 preferably comprises: a spring loaded spool 312 preferably mounted under the floor area of the automotive vehicle 6 and having a wire cable 314 wound thereon and attached through a pulley 316 to the front end of the upper rail of the correspondent track of the horizontal adjusting means 18; and a clamping device 318 of known type, which is electrically connected to the system controlling means 98 and which is operable by the system controlling means 98, for preventing further protraction of the correspondent wire cable 314 from the correspondent spring loaded spool 312 upon clamping.

It should be understood that the present invention is not limited to the disclosed arrangement for the preventing means 310 and the preventing means 310 may comprise any suitable arrangement of devices of known type.

The vehicle occupant emergency system 2 also comprises a rear vehicle seat 320 (FIGS. 1 and 22). The rear vehicle seat 320 is mounted in the automotive vehicle 6, behind the front vehicle seat 4, for accommodating at least one occupant 322 of the automotive vehicle 6. The rear vehicle seat 320 may be any vehicle seat of known type. Although the rear vehicle seat 320 is shown for simplicity as a single vehicle seat, the rear vehicle seat 320 may be a bench vehicle seat for accommodating more than one occupant of the automotive vehicle 6.

The rear vehicle seat 320 preferably comprises: a seat cushion 324; a seat back 326 preferably adjustable with respect to the seat cushion 324; a head restraint 328 preferably adjustable with respect to the seat back 326; and a seat frame 330.

The vehicle occupant emergency system 2 also comprises seventh sensing means 332 (FIG. 8). The seventh sensing means 332 may comprise any one or more sensing devices of known type which are: suitably mounted; electrically connected to the system controlling means 98; capable of sensing characteristics of the at least one occupant 322 in the rear vehicle seat 320, such as weight, height, a current position relative to the rear end of the front vehicle seat 4, a current position relative to the tracks of the horizontal adjusting means 18, a current distance to the rear end of the front vehicle seat 4, and a current distance to the tracks of the horizontal adjusting means 18; capable of sensing characteristics of a child-seat in the rear vehicle seat 320, such as whether it is in use, a current position relative to the rear end of the front vehicle seat 4, a current position relative to the tracks of the horizontal adjusting means 18, a current distance to the rear end of the front vehicle seat 4, and a current distance to the tracks of the horizontal adjusting means 18; capable of sensing characteristics of a load in the rear vehicle seat 320 or on the floor area of the automotive vehicle 6 behind the front vehicle seat 4, such as a current position relative to the rear end of the front vehicle seat 4, a current position relative to the tracks of the horizontal adjusting means 18, a current distance to the rear end of the front vehicle seat 4, and a current distance to the tracks of the horizontal adjusting means 18; and capable of providing signals to the system controlling means 98 indicative of the sensed characteristics.

If the rear vehicle seat 320 is a single vehicle seat, the seventh sensing means 332 preferably comprises: a weight sensor 334; a seat-back angle sensor 336; a height sensor 338; rear seat occupant position sensors 340, 342, 344, 346, 348 and 350; a plurality of foot sensors 352; and a child-seat sensing device 354.

Preferably, the system controlling means 98 has in its internal memory the relative position of the rear vehicle seat 320 to the front vehicle seat 4, the dimensions of the front vehicle seat 4 and the rear vehicle seat 320, and the distance from the stopping means 206 to the foremost position/end of the rear vehicle seat 320. Based on the received signals from the fourth sensing means 212, from the plurality of foot sensors 352, and from the rear seat occupant position sensors 340, 342, 344, 346, 348 and 350, and based on its internal memory and programming the system controlling means 98 determines: the current position of the occupant 322 in the rear vehicle seat 320 relative to the rear end of the front vehicle seat 4 and relative to the tracks of the horizontal adjusting means 18; the current distance from the occupant 322 in the rear vehicle seat 320 to the rear end of the front vehicle seat 4 and to the tracks of the horizontal adjusting means 18; and whether the occupant 322 in the rear vehicle seat 320 is within the range of the rearward movable front vehicle seat 4.

Based on the received signals from the weight sensor 334 and from the seat-back angle sensor 336 and based on its internal memory and programming the system controlling means 98 calculates in a known manner the weight of the occupant 322 in the rear vehicle seat 320.

Based on the received signals from the fourth sensing means 212, from the plurality of foot sensors 352, from the child-seat sensing device 354, and from the rear seat occupant position sensors 340, 342, 344, 346, 348 and 350, and based on its internal memory and programming the system controlling means 98 determines: whether there is a child-seat in use in the rear vehicle seat 320; the current position of a child-seat in the rear vehicle seat 320 relative to the rear end of the front vehicle seat 4 and relative to the tracks of the horizontal adjusting means 18; the current distance from a child-seat in the rear vehicle seat 320 to the rear end of the front vehicle seat 4 and to the tracks of the horizontal adjusting means 18; and whether there is a child-seat in use in the rear vehicle seat 320 which is within the range of the rearward movable front vehicle seat 4.

If there is some load in the rear vehicle seat 320 or on the floor area of the automotive vehicle 6 behind the front vehicle seat 4 and/or if there is some member of known type which supports a child-seat in the rear vehicle seat 320, its current position relative to the rear end of the front vehicle seat 4 and relative to the tracks of the horizontal adjusting means 18 as well as its current distance to the rear end of the front vehicle seat 4 and to the tracks of the horizontal adjusting means 18 are sensed by the plurality of foot sensors 352 and by the rear seat occupant position sensors 340, 342, 344, 346, 348 and 350.

It should be understood that the characteristics of the at least one occupant 322 in the rear vehicle seat 320, including characteristics of a child-seat in the rear vehicle seat 320 and a load in the rear vehicle seat 320 or on the floor area of the automotive vehicle 6 behind the front vehicle seat 4, may be sensed on the base of different physical measurement principles and the system controlling means 98 may provide suitable calculations.

The vehicle occupant emergency system 2 also comprises third restraining means 356 (FIGS. 1 and 22). Depending on the type of the rear vehicle seat 320, the third restraining means 356 may comprise any one or more seat-belt systems of known type which are capable of restraining the at least one occupant 322 in the rear vehicle seat 320 in the event of a vehicle collision.

If the rear vehicle seat 320 is a single vehicle seat, the third restraining means 356 preferably comprises a seat-integrated seat-belt system 358 of known type including an emergency locking retractor 360, a seat-belt webbing 362, an insertion tongue 364, a seat-belt buckle 366, and an anchor 368.

The third restraining means 356 also comprises second pretensioning means 370 (FIGS. 1 and 22) for further restraining the at least one occupant 322 in the rear vehicle seat 320. Depending on the number and type of the seat-belt systems comprised by the third restraining means 356, the second pretensioning means 370 may comprise any one or more belt-pretensioning devices of known type which are: suitably mounted; electrically connected to the system controlling means 98; operable by the system controlling means 98; and capable of removing regular belt-slack which exists under normal driving conditions. The second pretensioning means 370 preferably comprises multistage pyrotechnic belt-pretensioning device/devices having an integrated force limiter.

If the third restraining means 356 comprises the seat-integrated seat-belt system 358, the second pretensioning means 370 preferably comprises a buckle belt-pretensioning device 372 of known type for removing regular belt-slack. The buckle belt-pretensioning device 372 preferably is a multistage pyrotechnic belt-pretensioning device having an integrated force limiter and having at least two different pyrotechnic propellant charges which can be ignited individually or together at the same time by the system controlling means 98. If desired, in this case the second pretensioning means 370 instead of the buckle belt-pretensioning device 372 may comprise a retractor belt-pretensioning device 374 for removing regular belt-slack. If further desired, in this case the second pretensioning means 370 may comprise a buckle belt-pretensioning device 372 and a retractor belt-pretensioning device 374 in order the regular belt-slack to be jointly removed by both belt-pretensioning devices 372 and 374.

It should be understood that, if desired, each belt-pretensioning device comprised by the second pretensioning means 370 may have only one pyrotechnic propellant charge or it may be of other suitable type.

Depending on the number and type of the seat-belt systems comprised by the third restraining means 356 and depending on the number and type of the belt-pretensioning devices comprised by the second pretensioning means 370 for removing regular belt-slack, the second pretensioning means 370 may also comprise one or more back-up belt-pretensioning devices of known type which are kept in reserve for further removing regular belt-slack.

For example, if the third restraining means 356 comprises the seat-integrated seat-belt system 358, the second pretensioning means 370 may comprise a buckle belt-pretensioning device 372 for removing regular belt-slack and a back-up retractor belt-pretensioning device 374 kept in reserve for further removing regular belt-slack.

It should be understood that the present invention is not limited to the disclosed examples of the third restraining means 356 and of the second pretensioning means 370 for removing regular belt-slack.

The vehicle occupant emergency system 2 also comprises eighth sensing means 376 (FIG. 22). The eighth sensing means 376 may comprise any one or more sensing devices of known type which are: suitably mounted; electrically connected to the system controlling means 98; capable of sensing characteristics of the third restraining means 356, such as shoulder-belt tension, lap-belt tension, and whether the third restraining means 356 is in use; and capable of providing signals to the system controlling means 98 indicative of the sensed characteristics.

For example, depending on the number and type of the seat-belt systems comprised by the third restraining means 356, the eighth sensing means 376 may comprise one or more buckle sensors, shoulder-belt tension sensors, and lap-belt tension sensors of known type.

If the third restraining means 356 comprises the seat-integrated seat-belt system 358, the eighth sensing means 376 preferably comprises a buckle sensor 378, a shoulder-belt tension sensor 380, and a lap-belt tension sensor 382.

Upon energy supply, the first sensing means 100, the rear sensing means 118, the second sensing means 122, the third sensing means 132, the fourth sensing means 212, the fifth sensing means 224, the sixth sensing means 286, the seventh sensing means 332 and the eighth sensing means 376 continuously provide signals to the system controlling means 98 indicative of the sensed characteristics. The system controlling means 98 continuously stores the received signals and it may provide calculations in a known manner, if needed. The system controlling means 98 analyses all received signals and in the event of a vehicle collision the system controlling means 98 operates the releasing means 144, the moving means 184, the first pretensioning means 258, the locking means 300, the preventing means 310 and the second pretensioning means 370 depending on the received signals and its programming.

For example, the system controlling means 98 may decide not to activate the releasing means 144 and the moving means 184 in the event of a vehicle collision if the most recent signal received from the fourth sensing means 212 is indicative of being the front vehicle seat 4 horizontally adjusted to the stopping means 206.

For another example, if the first restraining means 244 comprises the seat-belt system 246, the system controlling means 98 may decide not to activate the releasing means 144 and the moving means 184 in the event of a front-end/front-angular vehicle collision if the most recent signal received from the buckle sensor 288 is indicative of no engagement between the insertion tongue 252 and the seat-belt buckle 254, because otherwise the occupant 8 in the front vehicle seat 4 may slip down from the front vehicle seat 4.

For a still another example, the system controlling means 98 may decide not to activate the releasing means 144 and the moving means 184 in the event of a vehicle collision if the most recent signal received from the B-pillar sensor 232 and/or from the side window opening sensor 234 is indicative of being some bodily part of the occupant 8 in the front vehicle seat 4 too close to the B-pillar 214 or put on or shown through the side window opening 226.

For another example, the system controlling means 98 may decide not to activate the releasing means 144 and the moving means 184 in the event of a vehicle collision if the most recent signal received from the fifth sensing means 224 is indicative of no occupant in the front vehicle seat 4.

If the releasing means 144 and/or the moving means 184 comprise actuators having a multistage power output, as it is preferred, in the event of a vehicle collision the system controlling means 98 determines the output stage of each actuator depending on the received signals and its programming.

For example, depending on the mounting and type of the actuators comprised by the releasing means 144 and the moving means 184, low inside/outside temperature may affect the power output of some or all the actuators.

For another example, low outside temperature, wet, and/or higher road wheel speed may be assumed as an indication of slippery conditions which may be assumed as higher probability of severe impact and higher probability of chain vehicle collision with different types of impacts possible.

For a still another example, if the releasing means 144 and/or the moving means 184 comprise actuators having a multistage power output, as it is preferred, in the event of a vehicle collision the system controlling means 98 may operate the output of each actuator based on the following principles: the higher the crash severity level, the higher the output stage; the closer the front vehicle seat 4 to the dashboard 216 or to the steering wheel 218, the higher the output stage; the heavier the occupant 8 in the front vehicle seat 4, the higher the output stage; the higher the occupant 8 in the front vehicle seat 4, the higher the output stage; the closer the occupant 8 in the front vehicle seat 4 to the dashboard 216 or to the steering wheel 218, the higher the output stage; the bigger the distance from the B-pillar 214 to the rear end of the seat cushion 10, the higher the output stage; the bigger the distance from the B-pillar 214 to the occupant 8 in the front vehicle seat 4, the higher the output stage; the less the shoulder-belt tension and/or the lap-belt tension, the higher the out-put stage; the lower the inside/outside temperature, the higher the output stage; and/or the more slippery the road conditions, the higher the output stage.

If the first pretensioning means 258 and/or the second pretensioning means 370 comprise belt-pretensioning devices having a multistage power output, as it is preferred, in the event of a vehicle collision the system controlling means 98 determines the output stage of each belt-pretensioning device depending on the received signals and its programming.

For example, in the event of a vehicle collision the system controlling means 98 may operate the output of each multistage belt-pretensioning device based on principles which are the same or similar to those in which the system controlling means 98 may operate the output of each multistage actuator comprised by the releasing means 144 and/or the moving means 184.

For another example, in the event of a low crash severity level front-end/front-angular vehicle collision the system controlling means 98 may decide to operate only the first pretensioning means 258 and/or the second pretensioning means 370.

For a still another example, in the event of a rear-end vehicle collision the system controlling means 98 may activate the first pretensioning means 258 and/or the second pretensioning means 370 depending on its programming and depending on the received signals from the fifth sensing means 224, from the sixth sensing means 286, from the seventh sensing means 332, from the eighth sensing means 376, and from the third sensing means 132.

For a still another example, if the first restraining means 244 comprises the seat-belt system 264 and if the regular/additional belt-slack is jointly removed by at least two belt-pretensioning devices comprised by the first pretensioning means 258, in the event of a vehicle collision the system controlling means 98 may activate only some of these belt-pretensioning devices or all of them at the same time or staggered in time.

For a still another example, if the first pretensioning means 258 and/or the second pretensioning means 370 comprise back-up belt-pretensioning devices kept in reserve, the system controlling means 98 may activate these belt-pretensioning devices depending on its programming and depending on the received signals during a chain/rollover vehicle collision.

For a still another example, in the event of a vehicle collision the system controlling means 98 may activate each device comprised by the locking means 300 upon receiving a signal from the fourth sensing means 212 indicative of being the front vehicle seat 4 moved to the stopping means 206.

For a still another example, the system controlling means 98 may activate each device comprised by the preventing means 310 upon receiving signals from the fourth sensing means 212 and from the first sensing means 100 or from the rear sensing means 118 indicative of a rollover/rear-end vehicle collision which follows a front-end/front-angular vehicle collision and indicative of not being the front vehicle seat 4 moved rearward up to the stopping means 206 during the front-end/front-angular vehicle collision.

For a still another example, in the event of a vehicle collision the system controlling means 98 may decide not to activate the releasing means 144 and the moving means 184 if the most recent signals received from the seventh sensing means 332 and/or from the eighth sensing means 376 are indicative of: a child-seat in use in the rear vehicle seat 320; a child-seat in use in the rear vehicle seat 320 which is within the range of the rearward movable front vehicle seat 4; an occupant in the rear vehicle seat 320; an occupant in the rear vehicle seat 320 that is within the range of the rearward movable front vehicle seat 4; being some bodily part of the occupant 322 in the rear vehicle seat 320 too close to the rear end of the front vehicle seat 4 and/or to one or both tracks of the horizontal adjusting means 18; a load which is in the rear vehicle seat 320 or on the floor area of the automotive vehicle 6 behind the front vehicle seat 4 and which is within the range of the rearward movable front vehicle seat 4; and/or not being the third restraining means 356 in use. In this case, for example, the system controlling means 98 may activate the first pretensioning means 258 for removing regular belt-slack and the second pretensioning means 370 for removing regular belt-slack, if there is an occupant in the rear vehicle seat 320 and if the third restraining means 356 is in use.

In the preferred embodiment, depending on the received signals and its programming, the system controlling means 98 may activate the actuators comprised by the releasing means 144 and the moving means 184 in the event of a side-impact to the automotive vehicle 6 in adjacency to the pre-emergency horizontal adjustment of the front vehicle seat 4 and having a severity level in excess of a predetermined value in order the front vehicle seat 4 and the occupant 8 to be moved rearward relative to the pre-emergency horizontal adjustment of the front vehicle seat 4 and away from the side-impact area as well as the B-pillar 214 to be used more effectively as a protection for the occupant 8 in the front vehicle seat 4.

Also in the preferred embodiment, depending on the received signals and its programming, the system controlling means 98 may activate the actuators comprised by the releasing means 144 and the moving means 184 in the event of a vehicle rollover collision in order the front vehicle seat 4 and the occupant 8 to be moved rearward relative to the pre-emergency horizontal adjustment of the front vehicle seat 4 and away from a front pillar 384 as well as the B-pillar 214 to be used more effectively as a protection for the occupant 8 in the front vehicle seat 4.

It should be understood that, if desired, the first sensing means 100 may comprise only one or more front-end/front-angular crash sensors and/or radar/laser sensors of known type in order the front vehicle seat 4 and the occupant 8 to be moved rearward relative to the pre-emergency horizontal adjustment of the front vehicle seat 4 and away from the impact area only in the event of a front-end/front-angular vehicle collision having a severity level in excess of a predetermined value.

The system controlling means 98 may activate each clamping device 302 (only one is shown) and/or each solenoid actuator 308 (only one is shown) comprised by the locking means 300 with a predetermined delay relative to the activation of the actuators comprised by the releasing means 144 and the moving means 184. The system controlling means 98 may vary this delay depending on the received signals and its programming and thus the locking means 300 may provide the front vehicle seat 4 with a multiplicity of positions to which the front vehicle seat 4 can be moved rearward relative to its pre-emergency horizontal adjustment by the moving means 184.

For example, if the most recent signals received by the system controlling means 98 from the fourth sensing means 212 and from the seventh sensing means 332 are indicative of 50 centimeters distance from the pre-emergency horizontal adjustment of the front vehicle seat 4 to the stopping means 206 and indicative of being the occupant 322 in the rear vehicle seat 320 10 centimeters within the range of the rearward movable front vehicle seat 4, the system controlling means 98, based on its internal memory and programming, may determine a delay for the activation of each clamping device 302 and/or each solenoid actuator 308 comprised by the locking means 300 relative to the activation of the actuators comprised by the releasing means 144 and the moving means 184, so that in the event of a vehicle collision the front vehicle seat 4 is moved rearward no more than 40 centimeters relative to its pre-emergency horizontal adjustment in order the occupant 8 in the front vehicle seat 4 to be moved rearward and away from the impact area as well as the occupant 322 in the rear vehicle seat 320 not to be injured by the rearward moving front vehicle seat 4.

The system controlling means 98 may activate each clamping device 318 (only one is shown) comprised by the preventing means 310 with a predetermined delay relative to the activation of the actuators comprised by the releasing means 144 and the moving means 184. The system controlling means 98 may vary this delay depending on the received signals and its programming and thus the preventing means 310 may provide the front vehicle seat 4 with a multiplicity of positions to which the front vehicle seat 4 can be moved rearward relative to its pre-emergency horizontal adjustment by the moving means 184.

Under the conditions of the aforementioned example of the operation of the locking means 300 by the system controlling means 98, the system controlling means 98, based on its internal memory and programming, may determine a delay for the activation of each clamping device 318 comprised by the preventing means 310 relative to the activation of the actuators comprised by the releasing means 144 and the moving means 184, so that in the event of a vehicle collision the front vehicle seat 4 is moved rearward no more than 40 centimeters relative to its pre-emergency horizontal adjustment as well as the front vehicle seat 4 is prevented from moving further rearward.

Depending on the type of the actuators comprised by the moving means 184, the moving means 184 may provide the front vehicle seat 4 with a multiplicity of positions to which the front vehicle seat 4 can be moved rearward relative to its pre-emergency horizontal adjustment in the event of a vehicle collision. For example, if the moving means 184 instead of the pyrotechnic actuators 192 comprises actuators (not shown) of a pressurized fluid container-cylinder-piston type and if the amount of pressurized fluid released from the container is controlled by the system controlling means 98, the system controlling means 98 may activate each solenoid actuator 308 comprised by the locking means 300 upon receiving a signal from the first sensing means 100 indicative of a vehicle collision, so that the front vehicle seat 4 is prevented from moving forward relative to its pre-emergency horizontal adjustment as well as the front vehicle seat 4 is prevented from moving forward after a rearward movement, and depending on the received signals and its programming and based on its internal memory the system controlling means 98 may vary the amount of the pressurized fluid released from the container. For another example, the same result may be achieved if the moving means 184 instead of the pyrotechnic actuators 192 comprises solenoid actuators (not shown) and if the system controlling means 98, depending on the received signals and its programming and based on its internal memory, vary the time during which the solenoid actuators comprised by the moving means 184 are activated.

Depending on the type of the actuators comprised by the moving means 184, the moving means 184 may maintain the front vehicle seat 4 at the stopping means 206 after the front vehicle seat 4 has been moved to the stopping means 206 by the moving means 184. For example, if the moving means 184 comprises one or more solenoid actuators (not shown) having an extensible and retractable plunger, the moving means 184 may maintain the front vehicle seat 4 at the stopping means 206, after the front vehicle seat 4 has been moved to the stopping means 206 by the moving means 184, as long as the solenoid actuators comprised by the moving means 184 are activated.

If the horizontal adjusting means 18 comprises a vehicle horizontal manual seat adjuster of the type of the vehicle horizontal manual seat adjuster comprising the track 20 and another identical track (not shown), depending on the type of the actuator/actuators comprised by the releasing means 144, the releasing means 144 may allow the return spring to move the latch pawl from the opened position to the locked position at each track so as to lock the tracks of the horizontal adjusting means 18 after the front vehicle seat 4 has been moved rearward relative to its pre-emergency horizontal adjustment by the moving means 184, and thus the horizontal adjusting means 18 may maintain the front vehicle seat 4 after the front vehicle seat 4 has been moved rearward relative to its pre-emergency horizontal adjustment by the moving means 184. For example, such a result may be achieved if the releasing means 144 comprises one or more solenoid actuators (not shown) which have an extensible and retractable plunger and which may be deactivated after a predetermined period of time. For another example, the same result may be achieved if the releasing means 144 comprises one or more actuators (not shown) of a cylinder-piston type which do not have an integrated locking device for the piston. The same result may be achieved if the horizontal adjusting means 18 comprises a vehicle horizontal power seat adjuster (not shown) of known type, which is not a screw shaft-nut type, and if the releasing means 144 comprises one or more locking/clamping devices (not shown) of known type which maintain the front vehicle seat 4 at each one of the multiplicity of horizontal adjustments and which may be operated by the system controlling means 98 from a locked position to an opened position and back to a locked position.

If the second restraining means 294 comprises one or more pairs of engaging members of known type mounted to the stopping means 206, as it is preferred, the second restraining means 294 restrains the front vehicle seat 4 from moving forward as soon as the front vehicle seat 4 is moved to the stopping means 206 by the moving means 184. In this case, depending on the type of the pairs of engaging members comprised by the second restraining means 294, the vehicle occupant emergency system 2 may further comprise second releasing means 386 (FIG. 14) for releasing the front vehicle seat 4 from the second restraining means 294 after a vehicle collision. Depending on the number and type of the pairs of engaging members comprised by the second restraining means 294, the second releasing means 386 may comprise any one or more devices of known type which are capable of disengaging the engaged members. If at each track of the horizontal adjusting means 18 the second restraining means 294 comprises the male-member 296 and the female-member 298, which are mounted to the stopping means 206 so that they engage each other as soon as the front vehicle seat 4 is moved to the stopping means 206 by the moving means 184 and which are a seat-belt buckle-insertion tongue type, as it is preferred, the second releasing means 386 preferably comprises two press-buttons 388 (only one is shown). Each press-button 388 is preferably mounted to one of the bumpers 208 so that it disengages the correspondent engaged male-female members 296 and 298 upon pressing.

The vehicle occupant emergency system 2 may further comprise stop sensing means 390 (FIG. 14). The stop sensing means 390 may comprise any one or more sensing devices of known type which are: suitably mounted; capable of sensing the front vehicle seat 4 as soon as it is moved to the stopping means 206 by the moving means 184; electrically connected to the locking means 300; and capable of activating the locking means 300 as soon as the front vehicle seat 4 is moved to the stopping means 206 by the moving means 184. The stop sensing means 390 preferably is electrically connected to the locking means 300 through the system controlling means 98 in a known manner but, if desired, the stop sensing means 390 may be electrically connected to the locking means 300 directly. The stop sensing means 390 preferably comprises a locking sensor 392 which preferably is a seat-belt buckle sensor/switch type.

Figure 23:
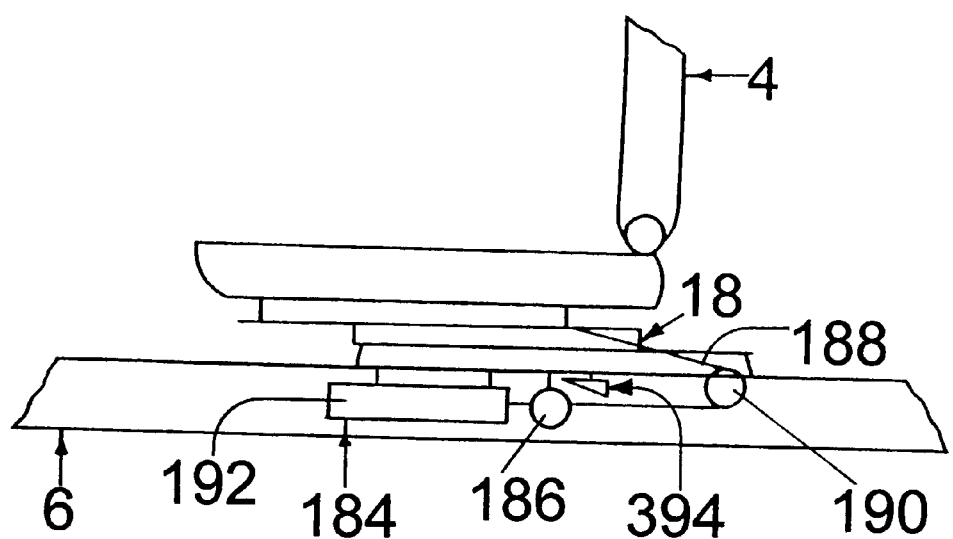
FIG. 23 is a schematic view illustrating the moving means and second locking means.
Figure 24:
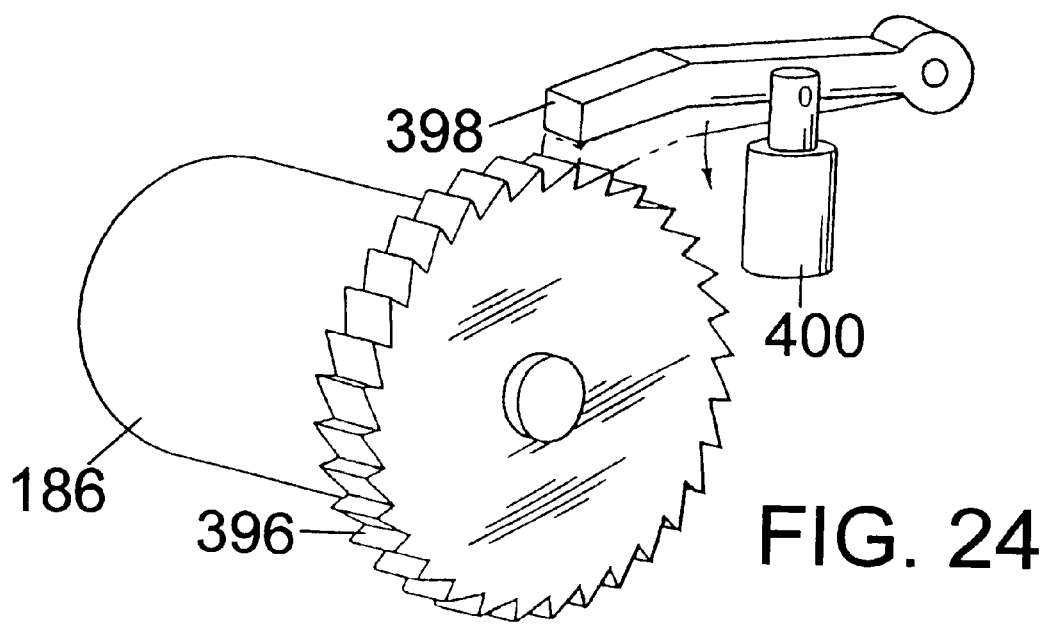
FIG. 24 is a schematic view illustrating the second locking means.
Figure 25:
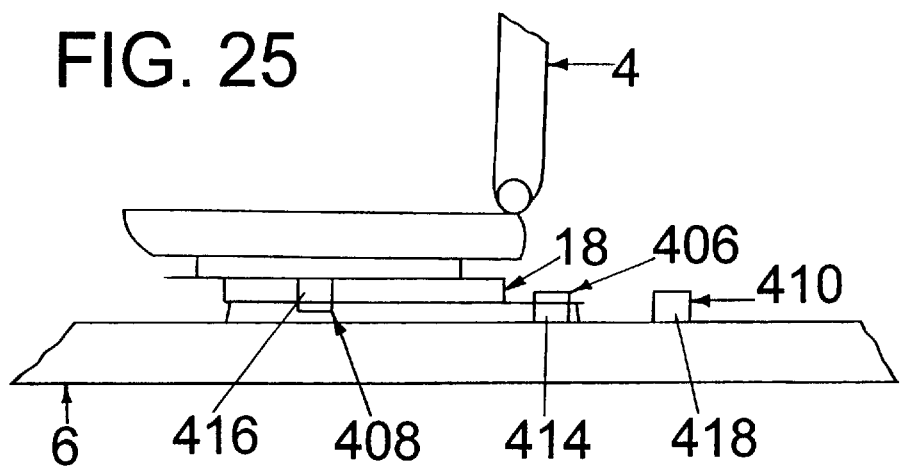
FIG. 25 is a schematic view illustrating first stopping means, second stopping means, and third stopping means.
Figure 26:
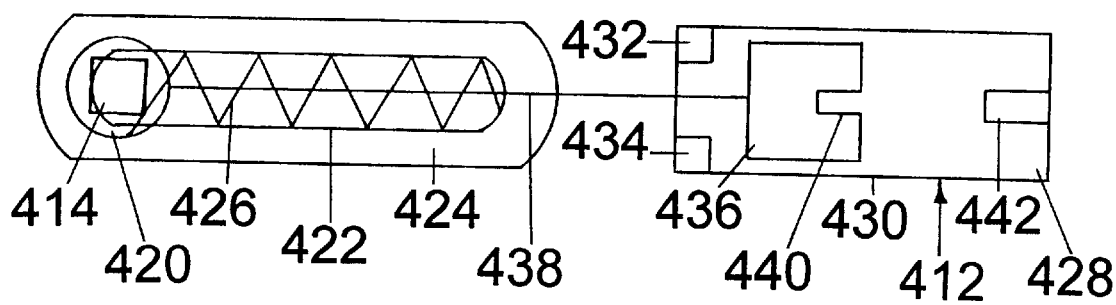
FIG. 26 is a schematic view illustrating removing means.

If the moving means 184 comprises one or more spring loaded spools having a connecting member of known type wound thereon and suitably attached to the front vehicle seat 4, as it is preferred, the vehicle occupant emergency system 2 may further comprise second locking means 394 (FIGS. 23 and 24). The second locking means 394 may comprise at least one ratchet wheel mounted to each spring loaded spool, at least one lock pawl for locking each ratchet wheel, and at least one actuator for actuating each lock pawl. The at least one actuator for actuating each lock pawl may be any actuator of known type which is suitably mounted and which is capable of actuating a correspondent lock pawl as soon as a connecting member, which is wound on a correspondent spring loaded spool and which is suitably attached to the front vehicle seat 4, is protracted at a rate increase in excess of a predetermined value or as soon as the automotive vehicle 6 is decelerated in excess of another predetermined value, so that the front vehicle seat 4 is prevented from moving forward relative to its pre-emergency horizontal adjustment. If at each track of the horizontal adjusting means 18 the moving means 184 comprises the pyrotechnic actuator 192 connected to the spring loaded spool 186 which has the wire cable 188 wound thereon and suitably attached through the pulley 190 to the front vehicle seat 4, as it is preferred, at each spring loaded spool 186 (only one is shown) the second locking means 394 preferably comprises: a ratchet wheel 396 mounted to the spring loaded spool 186; a lock pawl 398 for locking the ratchet wheel 396; and an inertial mass acceleration sensor 400 of known type for actuating the lock pawl 398 as soon as the wire cable 188 is protracted from the spring loaded spool 186 at a rate increase in excess of a predetermined value.

The vehicle occupant emergency system 2 may further comprise a switch 402 (FIG. 7) of known type for switching on and switching off the releasing means 144 and the moving means 184.

It should be understood that, if desired, the releasing means 144 and the moving means 184 may be switched on and switched off by separate switches of known type.

The vehicle occupant emergency system 2 may be connected with a global positioning system 404 (FIG. 7) having an automatic collision notification system so that an operator of the global positioning system 404 is notified as soon as a vehicle collision occurs.

The stopping means 206 may comprise: first stopping means 406 (FIG. 25) mounted to the automotive vehicle 6, to the front vehicle seat 4, or to the horizontal adjusting means 18 so that it controls the maximum extent and it is removable upon application of a removing force of known type; and second stopping means 408 mounted to the automotive vehicle 6, to the front vehicle seat 4, or to the horizontal adjusting means 18 so that it engages the first stopping means 406 for controlling the maximum extent. In this case the vehicle occupant emergency system 2 may further comprise: third stopping means 410 (FIG. 25) for controlling a second maximum extent to which the front vehicle seat 4 can be moved rearward relative to its pre-emergency horizontal adjustment by the moving means 184 in the event of a vehicle collision, the third stopping means 410 being mounted to the automotive vehicle 6, to the front vehicle seat 4, or to the horizontal adjusting means 18 so that it engages the second stopping means 408 for controlling the second maximum extent; and removing means 412 (FIG. 26) for applying the removing force of known type to the first stopping means 406 so that the front vehicle seat 4 can be moved to the third stopping means 410 by the moving means 184 in the event of a vehicle collision, the removing means 412 being electrically connected to the system controlling means 98, and in the event of a vehicle collision the system controlling means 98 operates the removing means 412 depending on the received signals and its programming.

The first stopping means 406 and the second stopping means 408 may be respectively the first and the second members of any one or more pairs of engaging members of known type which are suitably mounted, which are capable of controlling the maximum extent, and which allow the first member of each pair of engaging members to be removable upon application of a removing force of known type. For example, each first member may be removably mounted in a known manner to the lower rail inside of one of the tracks of the horizontal adjusting means 18 and each second member may be mounted to the upper rail inside of the same track so that it engages the first member as soon as the front vehicle seat 4 is moved to the maximum extent. For another example, each first member may be removably mounted in a known manner to the automotive vehicle 6 or to the lower rail outside of one of the tracks of the horizontal adjusting means 18 and each second member may be mounted to the upper rail outside of the same track or to the seat frame 16 so that it engages the first member as soon as the front vehicle seat 4 is moved to the maximum extent.

At each track of the horizontal adjusting means 18 the first stopping means 406 preferably comprises a dashpot 414 removably mounted in a known manner to the automotive vehicle 6. At each track of the horizontal adjusting means 18 the second stopping means 408 preferably comprises a bumper 416 mounted to the upper rail outside of the track so that it engages the dashpot 414 at the same track as soon as the front vehicle seat 4 is moved to its predetermined rearmost extent which is the maximum extent to which the front vehicle seat 4 can be moved rearward relative to its pre-emergency horizontal adjustment by the moving means 184 in the event of a vehicle collision. At each track of the horizontal adjusting means 18 the dashpot 414 and the bumper 416 are preferably side-mounted relative to the track so that they do not occupy space from the floor area of the automotive vehicle 6 behind the front vehicle seat 4.

Depending on the number and type of the members comprised by the second stopping means 408, the third stopping means 410 may comprise any one or more members of known type which are capable of controlling the second maximum extent and which are suitably mounted to the automotive vehicle 6, to the front vehicle seat 4, or to the horizontal adjusting means 18, so that they engage the members comprised by the second stopping means 408 as soon as the front vehicle seat 4 is moved to the second maximum extent.

If at each track of the horizontal adjusting means 18 the second stopping means 408 comprises the bumper 416 side-mounted to the upper rail of the track, as it is preferred, at each track of the horizontal adjusting means 18 the third stopping means 410 preferably comprises a dashpot 418 mounted to the automotive vehicle 6 so that it engages the bumper 416, which is mounted to the upper rail of the same track, as soon as the front vehicle seat 4 is moved to its second predetermined rearmost extent which is the second maximum extent to which the front vehicle seat 4 can be moved rearward relative to its pre-emergency horizontal adjustment by the moving means 184 in the event of a vehicle collision.

The first stopping means 406 may be removably mounted by any one or more suitable arrangements of known type so that the first stopping means 406 is removable upon application of a removing force of known type which is operable by the system controlling means 98. For example, each member comprised by the first stopping means 406 may be removably mounted to the automotive vehicle 6, to the front vehicle seat 4, or to the horizontal adjusting means 18 based on principles which are the same or similar to those for removably mounting each nut 68 to the lower rail 48 of each track 46.

Depending on the number and type of the members comprised by the first stopping means 406 and depending on the way by which each member is removably mounted to the automotive vehicle 6, to the front vehicle seat 4, or to the horizontal adjusting means 18, the removing means 412 may comprise any one or more devices of known type which are: suitably mounted; electrically connected to the system controlling means 98; operable by the system controlling means 98; and capable of applying the removing force of known type to the members comprised by the first stopping means 406 so that the front vehicle seat 4 can be moved to the third stopping means 410 by the moving means 184 in the event of a vehicle collision. For example, the removing means 412 may comprise one or more of the actuators which may be comprised by the releasing means 144.

Depending on the number, type and mounting of the members comprised by the first stopping means 406, the removing means 412 may be mounted in different places and may apply the removing force of known type directly or through one or more transmitting/connecting members of known type.

If at each track of the horizontal adjusting means 18 the first stopping means 406 comprises the dashpot 414 and the second stopping means 408 comprises the bumper 416, as it is preferred, each dashpot 414 (only one is shown) is preferably rigidly secured to a slide 420 which is movable along a longitudinal slot 422 in an anchor plate 424 which is rigidly secured to the automotive vehicle 6 preferably in perpendicular to the direction of the horizontally movable front vehicle seat 4. A linear spring 426 biases the slide 420 and the dashpot 414 into the engaging position of the dashpot 414 with the correspondent bumper 416 at each track of the horizontal adjusting means 18.

Considering the aforementioned preferred arrangement for removably mounting the first stopping means 406, at each track of the horizontal adjusting means 18 the removing means 412 preferably comprises a pyrotechnic actuator 428 which is a gas generator-cylinder-piston-locking member type and which preferably has at least two different pyrotechnic propellant charges which can be ignited individually or together at the same time by the system controlling means 98 in a known manner depending on the received signals by the system controlling means 98 and its programming. Each pyrotechnic actuator 428 (only one is shown) is connected to one of the slides 420 (only one is shown) and preferably comprises: a cylinder 430; two different pyrotechnic propellant charges 432 and 434; a piston 436 connected to the correspondent slide 420 by a wire cable 438; and a locking device of known type for the piston 436, preferably members 440 and 442 which engage each other upon abutting. Upon activation of one or both pyrotechnic propellant charges 432 and 434 of each pyrotechnic actuator 428 by the system controlling means 98 in the event of a vehicle collision, combustion products generated by the pyrotechnic propellant charge 432 and/or by the pyrotechnic propellant charge 434 of each pyrotechnic actuator 428 instantaneously move the correspondent piston 436 to the opposite end of the correspondent cylinder 430 where the correspondent piston 436 is locked by the correspondent engaging members 440 and 442. Thus each slide 420 is moved away from the engaging position of the correspondent dashpot 414 and the front vehicle seat 4 can be moved to the third stopping means 410 by the moving means 184.

It should be understood that, if desired, each pyrotechnic actuator 428 may have only one pyrotechnic propellant charge.

It should be also understood that the present invention is not limited to the disclosed preferred arrangements for the first stopping means 406, for the second stopping means 408, for the third stopping means 410, for the removing means 412, and for the removing force.

Figure 27:
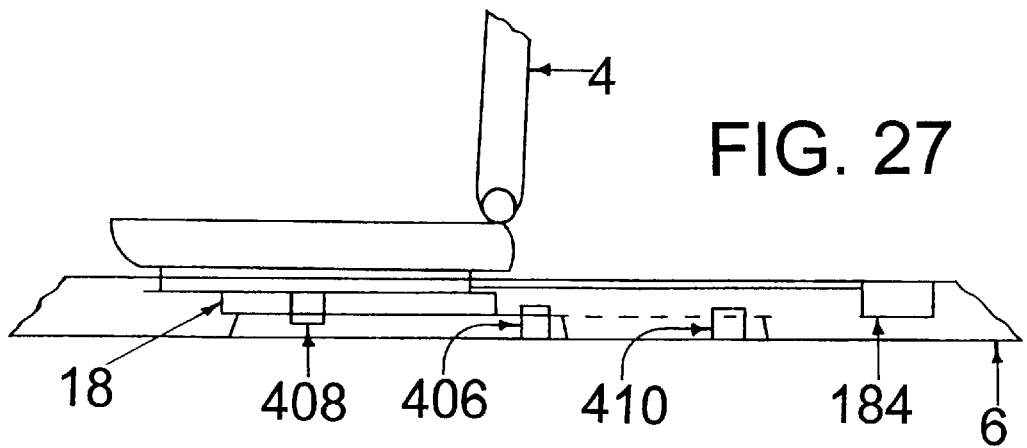
FIG. 27 is a schematic view illustrating the first stopping means, the second stopping means, the third stopping means, the moving means, and the horizontal adjusting means having extended lower rails.
Figure 28:
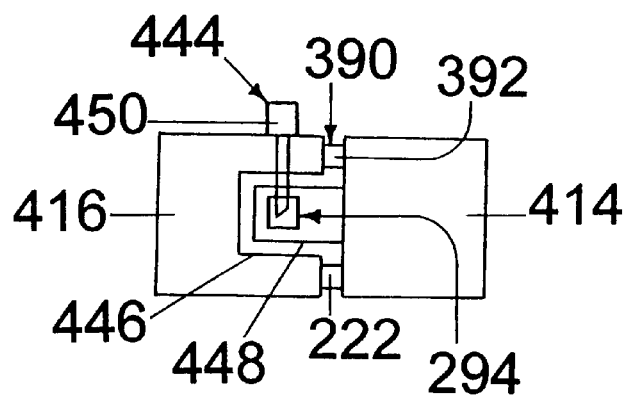
FIG. 28 is a schematic view illustrating the second restraining means, the stop sensing means, and third releasing means.
Figure 29:
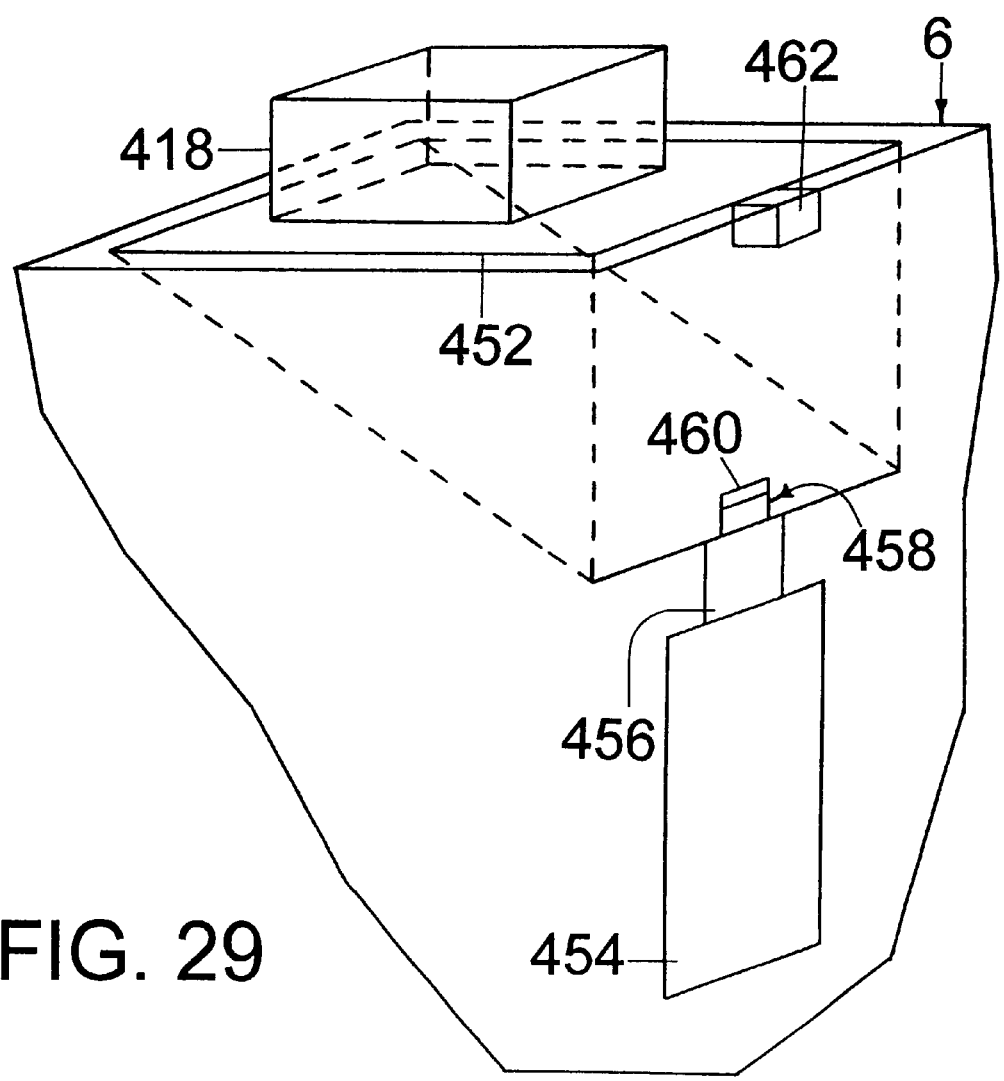
FIG. 29 is a schematic view illustrating the third stopping means.

Depending on the specific construction of the horizontal adjusting means 18 and depending on the location of the third stopping means 410 relative to the horizontal adjusting means 18, the horizontal adjusting means 18 may be adapted to enable the front vehicle seat 4 to be moved to the third stopping means 410 by the moving means 184 in the event of a vehicle collision by extending the lower rail of each track, as shown with dotted lines in FIG. 27.

If the horizontal adjusting means 18 comprises a vehicle horizontal power seat adjuster of known type, depending on the specific construction of the vehicle horizontal power seat adjuster and depending on the distance between the third stopping means 410 and the rearmost horizontal adjustment of the front vehicle seat 4, the wire harness, which extends between the drive motor and the electric power source, may be connected to the drive motor so that it is disengaged from the drive motor as soon as the front vehicle seat 4 is moved rearward farther from a predetermined point.

Depending on the type of the actuators comprised by the moving means 184, the moving means 184 may maintain the front vehicle seat 4 at the first stopping means 406 or at the third stopping means 410 after the front vehicle seat 4 has been moved respectively to the first stopping means 406 or to the third stopping means 410 by the moving means 184. For example, if the moving means 184 comprises one or more solenoid actuators (not shown) having an extensible and retractable plunger, the moving means 184 may maintain the front vehicle seat 4 at the first stopping means 406 or at the third stopping means 410, after the front vehicle seat 4 has been moved respectively to the first stopping means 406 or to the third stopping means 410 by the moving means 184, as long as the solenoid actuators comprised by the moving means 184 are activated.

If the second restraining means 294 comprises one or more pairs of engaging members of known type mounted to the first stopping means 406, to the second stopping means 408 and to the third stopping means 410 so that the engaging members engage each other as soon as the front vehicle seat 4 is moved to the first stopping means 406 or to the third stopping means 410 by the moving means 184, the second restraining means 294 restrains the front vehicle seat 4 from moving forward as soon as the front vehicle seat 4 is moved to the first stopping means 406 or to the third stopping means 410 by the moving means 184. In this case, depending on the type of the pairs of engaging members comprised by the second restraining means 294, the vehicle occupant emergency system 2 may further comprise third releasing means 444 (FIG. 28) for releasing the front vehicle seat 4 from the second restraining means 294 after a vehicle collision. Depending on the type and number of the pairs of engaging members comprised by the second restraining means 294, the third releasing means 444 may comprise any one or more devices of known type which are capable of disengaging the engaged members. If at each track of the horizontal adjusting means 18 the first stopping means 406 comprises the dashpot 414, the second stopping means 408 comprises the bumper 416 and the third stopping means 410 comprises the dashpot 418, as it is preferred, and if the second restraining means 294 comprises two female-members and four male-members of a seat-belt buckle-insertion tongue type, one female-member 446 (only one is shown) being mounted to one of the bumpers 416 (only one is shown) and one male-member 448 (only one is shown) being mounted to one of the dashpots 414 and 418 (only one is shown) so that it engages the correspondent female-member 446 as soon as the front vehicle seat 4 is moved to the first stopping means 406 or to the third stopping means 410 by the moving means 184, the third releasing means 444 preferably comprises two press-buttons 450 (only one is shown). Each press-button 450 is preferably mounted to one of the bumpers 416 so that it disengages the correspondent engaged female-male members 446 and 448 upon pressing.

Depending on the location of the members comprised by the third stopping means 410 and if desired, the members comprised by the third stopping means 410 may be operated in a known manner by the system controlling means 98 depending on the received signals by the system controlling means 98 and its programming so that they do not occupy space from the floor area of the automotive vehicle 6 behind the front vehicle seat 4. Each member comprised by the third stopping means 410 in this case may be operated by the system controlling means 98 through any suitable arrangement for one or more members/devices of known type. For example, if at each track of the horizontal adjusting means 18 the third stopping means 410 comprises the dashpot 418, the dashpot 418 at each track may be rigidly secured to a plate 452 (FIG. 29) which is movable between a hidden position under the floor area of the automotive vehicle 6 and a locked position in which the correspondent dashpot 418 is in its engaging position for controlling the second maximum extent. Each plate 452 (only one is shown) may be moved from its hidden position to its locked position by any one or more actuators of known type which are: suitably mounted; electrically connected to the system controlling means 98; operable by the system controlling means 98; and capable of moving the plate 452 from its hidden position to its locked position so that in the event of a vehicle collision, in which the front vehicle seat 4 should be moved to the third stopping means 410, the dashpot 418, which is secured to the plate 452, is in its engaging position for controlling the second maximum extent. For example, at each track of the horizontal adjusting means 18 the correspondent plate 452 may be actuated by a solenoid actuator 454 having an extensible and retractable plunger 456. Each plate 452 may be secured to the floor area of the automotive vehicle 6 at its locked position by any one or more locking devices of known type which upon locking are capable of holding the plate 452 so that the dashpot 418, which is secured to the plate 452, controls the second maximum extent. For example, at each track of the horizontal adjusting means 18 the correspondent plate 452 may be secured to the floor area of the automotive vehicle 6 at its locked position by a locking device 458 which comprises a male-member 460 of known type mounted to the correspondent plate 452, a female-member 462 of known type mounted to the automotive vehicle 6 and a press-button (not shown) of known type for unlocking the locking device 458.

In the event of a vehicle collision, depending on the received signals and its programming, the system controlling means 98 may operate the preventing means 310 in a known manner for preventing the front vehicle seat 4 from moving further rearward after the front vehicle seat 4 has been moved rearward relative to its pre-emergency horizontal adjustment by the moving means 184 but not up to the first stopping means 406 or up to the third stopping means 410.

The vehicle occupant emergency system 2 may further comprise a switch 464 (FIG. 7) of known type for switching on and switching off the removing means 412.

Preferably, in its internal memory the system controlling means 98 has the distance from the first stopping means 406 to the third stopping means 410 and based on the received signals from the fourth sensing means 212, from the seventh sensing means 332 and from the eighth sensing means 376, and based on its internal memory and programming the system controlling means 98 determines in a known manner: whether there is an occupant/child-seat in use in the rear vehicle seat 320; whether there is a load in the rear vehicle seat 320 or on the floor area of the automotive vehicle 6 behind the front vehicle seat 4; the current position of an occupant/child-seat, that is in the rear vehicle seat 320, relative to the rear end of the front vehicle seat 4 and relative to the tracks of the horizontal adjusting means 18; the current position of a load, which is in the rear vehicle seat 320 or on the floor area of the automotive vehicle 6 behind the front vehicle seat 4, relative to the rear end of the front vehicle seat 4 and relative to the tracks of the horizontal adjusting means 18; the current distance from an occupant/child-seat, that is in the rear vehicle seat 320, to the rear end of the front vehicle seat 4 and to the tracks of the horizontal adjusting means 18; the current distance from a load, which is in the rear vehicle seat 320 or on the floor area of the automotive vehicle 6 behind the front vehicle seat 4, to the rear end of the front vehicle seat 4 and to the tracks of the horizontal adjusting means 18; whether an occupant/child-seat, that is in the rear vehicle seat 320, is within the first stopping means range or within the third stopping means range of the rearward movable front vehicle seat 4; and whether a load, which is in the rear vehicle seat 320 or on the floor area of the automotive vehicle 6 behind the front vehicle seat 4, is within the first stopping means range or within the third stopping means range of the rearward movable front vehicle seat 4.

In the event of a vehicle collision the system controlling means 98 operates in this case the removing means 412 depending on the received signals and its programming. For example, if the most recent signals received from the fourth sensing means 212 and from the seventh sensing means 332 are indicative of being the occupant 322 in the rear vehicle seat 320 20 centimeters behind the first stopping means range and 10 centimeters within the third stopping means range of the rearward movable front vehicle seat 4, in the event of a vehicle collision the system controlling means 98 may operate the releasing means 144 and the moving means 184 so that the front vehicle seat 4 is moved rearward to the first stopping means 406. For another example, under the conditions of the aforementioned example, in the event of a vehicle collision the system controlling means 98 may activate the devices comprised by the releasing means 144, by the moving means 184 and by the removing means 412, and the system controlling means 98 may also activate the devices comprised by the locking means 300 and/or the devices comprised by the preventing means 310 but with a predetermined delay relative to the activation of the devices comprised by the releasing means 144, by the moving means 184 and by the removing means 412, so that the front vehicle seat 4 is moved rearward no more than 20 centimeters behind the first stopping means range in order the occupant 8 in the front vehicle seat 4 to be better protected from injuries as well as the occupant 322 in the rear vehicle seat 320 not to be injured by the rearward moving front vehicle seat 4.

Depending on the type of the devices comprised by the first sensing means 100 and/or by the rear sensing means 118 and depending on the received signals and its programming, the system controlling means 98 may operate the vehicle occupant emergency system 2 a moment before a vehicle collision. For example, if the first sensing means 100 comprises one or more radar/laser sensors for sensing characteristics of a front-end/front-angular vehicle collision before it actually happens, the system controlling means 98, upon receiving a signal from a radar/laser sensor indicative of a very severe front-end/front-angular impact, may decide to activate the devices comprised by the releasing means 144 and the moving means 184 a moment before the impact in order the occupant 8 in the front vehicle seat 4 to be better protected from injuries. In the event of a very severe side-end vehicle collision there is very limited time for the operation of the vehicle occupant emergency system 2 by the system controlling means 98 as well as there is very limited time for the activation of the devices which are operated by the system controlling means 98, so for another example, if the first sensing means 100 comprises one or more radar/laser sensors for sensing characteristics of a side-end vehicle collision before it actually happens, the system controlling means 98, upon receiving a signal from a radar/laser sensor indicative of a very severe side-impact in adjacency to the pre-emergency horizontal adjustment of the front vehicle seat 4, may decide to activate the devices comprised by the releasing means 144 and the moving means 184 a moment before the impact in order the occupant 8 in the front vehicle seat 4 to be better protected from injuries as well as the B-pillar 214 to be used more effectively as a protection for the occupant 8 in the front vehicle seat 4.

The automotive vehicle 6 may comprise, in addition to the vehicle occupant emergency system 2, one or more safety systems. The vehicle occupant emergency system 2 may operate in concert with one or more of these safety systems. For example, the vehicle occupant emergency system 2 may operate in concert with a front air-bag 466 (FIG. 1) which is operated by a separate control unit (not shown) for protecting the occupant 8 in the front vehicle seat 4 in the event of a front-end/front-angular vehicle collision.

The automotive vehicle 6 may also comprise one or more safety devices and the vehicle occupant emergency system 2 may also operate in concert with one or more of these safety devices. For example, the vehicle occupant emergency system 2 may also operate in concert with a child-seat device 468 (FIG. 22) which automatically switches off the releasing means 144 and the moving means 184 as soon as a properly installed child-seat is in use in the rear vehicle seat 320.

The automotive vehicle 6 may also comprise one or more warning systems and the vehicle occupant emergency system 2 may also operate in concert with one or more of these warning systems. For example, the vehicle occupant emergency system 2 may also operate in concert with one or more check-control devices (not shown) which monitor important functions of the vehicle occupant emergency system 2 and provide warnings in a known manner when some element requires attention of a certified officer.

The vehicle occupant emergency system 2 may be integrated with one or more safety systems which are operable by the system controlling means 98. For example, the vehicle occupant emergency system 2 may be integrated with the front air-bag 466 which the system controlling means 98 operates depending on the received signals and its programming. For example, in the event of a front-end/front-angular vehicle collision the system controlling means 98 may decide not to activate the devices comprised by the releasing means 144 and the moving means 184 and the system controlling means 98 may also decide to activate the front air-bag 466 and the first pretensioning means 258 for removing regular belt-slack, if the most recent signal received from the seventh sensing means 332 is indicative of a child-seat in use in the rear vehicle seat 320.

The vehicle occupant emergency system 2 may be also integrated with one or more safety devices which are operable by the system controlling means 98. For example, the vehicle occupant emergency system 2 may be also integrated with a cut off device 470 (FIG. 7) which is operated by the system controlling means 98 to cut off the fuel supply in the event of a severe vehicle collision.

The vehicle occupant emergency system 2 may be also integrated with one or more warning systems. For example, the vehicle occupant emergency system 2 may be also integrated with a warning (not shown) indicative of not being the first restraining means 244 in use.

The automotive vehicle 6 may comprise other vehicle seats located behind the rear vehicle seat 320 and the vehicle occupant emergency system 2 may be also integrated with at least one other vehicle occupant emergency system which the system controlling means 98 operates depending on the received signals and its programming. For example, the vehicle occupant emergency system 2 may be also integrated with a vehicle occupant emergency system 472 (FIG. 1) which is installed to the rear vehicle seat 320. Depending on the elements comprised by the vehicle occupant emergency system 2, the vehicle occupant emergency system 472 may comprise any modification of any of the embodiments of the vehicle occupant emergency system 2 which is suitable for the rear vehicle seat 320 and for the at least one occupant 322 in the rear vehicle seat 320 and which is suitable for the purpose of the present invention.

For example, if the vehicle occupant emergency system 2 is integrated with the vehicle occupant emergency system 472 and if the most recent signals received from the fourth sensing means 212 and from the seventh sensing means 332 are indicative of 50 centimeters distance from the pre-emergency horizontal adjustment of the front vehicle seat 4 to the stopping means 206 and indicative of being the occupant 322 in the rear vehicle seat 320 20 centimeters within the range of the rearward movable front vehicle seat 4, in the event of a vehicle collision, in which the front vehicle seat 4 should be moved rearward up to the stopping means 206, the system controlling means 98 may operate the vehicle occupant emergency system 2 so that the front vehicle seat 4 is moved rearward to the stopping means 206 and the system controlling means 98 may also operate the vehicle occupant emergency system 472 so that the rear vehicle seat 320 is moved rearward at least 20 centimeters in order the occupant 322 in the rear vehicle seat 320 not to be injured by the rearward moving front vehicle seat 4.

For another example, if the stopping means 206 comprises the first stopping means 406 and the second stopping means 408, if the vehicle occupant emergency system 2 comprises the third stopping means 410 and the removing means 412, if the vehicle occupant emergency system 2 is integrated with the vehicle occupant emergency system 472, and if the most recent signals received from the fourth sensing means 212 and from the seventh sensing means 332 are indicative of being the occupant 322 in the rear vehicle seat 320 20 centimeters within the third stopping means range of the front vehicle seat 4, in the event of a vehicle collision, in which the front vehicle seat 4 should be moved rearward up to the third stopping means 410, the system controlling means 98 may operate the vehicle occupant emergency system 2 so that the front vehicle seat 4 is moved rearward to the third stopping means 410 and the system controlling means 98 may also operate the vehicle occupant emergency system 472 so that the rear vehicle seat 320 is moved rearward at least 20 centimeters in order the occupant 322 in the rear vehicle seat 320 not to be injured by the rearward moving front vehicle seat 4.

It should be understood that, depending on the design and the engineering of the automotive vehicle 6 as a whole including other safety features, the system controlling means 98 may be programmed in different ways to operate the vehicle occupant emergency system 2 depending on the received signals.

It should be also understood that the present invention is not limited to the disclosed examples and preferred arrangements for the elements of the vehicle occupant emergency system 2.

It should be further understood that, although only a single embodiment of the present invention has been disclosed in detail, the present invention is not limited to the features of this embodiment, but includes all variations and modifications within the scope of the claims.

What I claim as my invention is:

1. A vehicle occupant emergency system mounted in an automotive vehicle for protecting at least one occupant of the automotive vehicle, the vehicle occupant emergency system comprising:

a front vehicle seat for accommodating at least one occupant of the automotive vehicle;

horizontal adjusting means for providing the front vehicle seat with a multiplicity of horizontal adjustments relative to the automotive vehicle, the horizontal adjusting means maintaining the front vehicle seat at each one of the multiplicity of horizontal adjustments;

system controlling means for operating the vehicle occupant emergency system;

first sensing means for sensing characteristics of a vehicle collision, the first sensing means being connected to the system controlling means and providing signals to the system controlling means indicative of the sensed characteristics;

second sensing means for sensing characteristics of the automotive vehicle, the second sensing means being connected to the system controlling means and providing signals to the system controlling means indicative of the sensed characteristics;

third sensing means for sensing characteristics of the environment inside and outside of the automotive vehicle, the third sensing means being connected to the system controlling means and providing signals to the system controlling means indicative of the sensed characteristics;

releasing means operated by the system controlling means for releasing the front vehicle seat from a pre-emergency horizontal adjustment in the event of a vehicle collision so that the front vehicle seat can be moved rearward relative to its pre-emergency horizontal adjustment;

moving means operated by the system controlling means for moving the front vehicle seat rearward relative to its pre-emergency horizontal adjustment in the event of a vehicle collision after the front vehicle seat has been released from its pre-emergency horizontal adjustment by the releasing means, the moving means allowing the front vehicle seat to be adjusted to each one of the multiplicity of horizontal adjustments before a vehicle collision;

stopping means for controlling a maximum extent to which the front vehicle seat can be moved rearward relative to its pre-emergency horizontal adjustment by the moving means in the event of a vehicle collision;

fourth sensing means for sensing characteristics of the front vehicle seat, the fourth sensing means being connected to the system controlling means and providing signals to the system controlling means indicative of the sensed characteristics;

fifth sensing means for sensing characteristics of the at least one occupant in the front vehicle seat, the fifth sensing means being connected to the system controlling means and providing signals to the system controlling means indicative of the sensed characteristics;

first restraining means for restraining the at least one occupant in the front vehicle seat;

sixth sensing means for sensing characteristics of the first restraining means, the sixth sensing means being connected to the system controlling means and providing signals to the system controlling means indicative of the sensed characteristics; and second restraining means for restraining the front vehicle seat from moving forward after the front vehicle seat has been moved rearward relative to its pre-emergency horizontal adjustment by the moving means;

wherein the system controlling means receiving signals from the first sensing means, from the second sensing means, from the third sensing means, from the fourth sensing means, from the fifth sensing means, and from the sixth sensing means, and in the event of a vehicle collision the system controlling means operating the releasing means and the moving means depending on the received signals and a programming.

2. A vehicle occupant emergency system as claimed in claim 1, wherein the horizontal adjusting means being adapted to enable the front vehicle seat to be released from its pre-emergency horizontal adjustment by the releasing means and to be moved rearward relative to its pre-emergency horizontal adjustment by the moving means in the event of a vehicle collision.

3. A vehicle occupant emergency system as claimed in claim 1, wherein the horizontal adjusting means being adapted to enable the front vehicle seat to be moved to the stopping means by the moving means in the event of a vehicle collision.

4. A vehicle occupant emergency system as claimed in claim 1, wherein the releasing means allowing the front vehicle seat to be adjusted to each one of the multiplicity of horizontal adjustments before a vehicle collision.

5. A vehicle occupant emergency system as claimed in claim 1, wherein the releasing means allowing the horizontal adjusting means to maintain the front vehicle seat after the front vehicle seat has been moved rearward relative to its pre-emergency horizontal adjustment by the moving means, and the horizontal adjusting means maintaining the front vehicle seat after the front vehicle seat has been moved rearward relative to its pre-emergency horizontal adjustment by the moving means.

6. A vehicle occupant emergency system as claimed in claim 1, wherein the moving means maintaining the front vehicle seat at the stopping means after the front vehicle seat has been moved to the stopping means by the moving means.

7. A vehicle occupant emergency system as claimed in claim 1, wherein the first restraining means comprising first pretensioning means operated by the system controlling means for further restraining the at least one occupant in the front vehicle seat, and in the event of a vehicle collision the system controlling means operating the first pretensioning means depending on the received signals and its programming.

8. A vehicle occupant emergency system as claimed in claim 7, wherein the vehicle occupant emergency system further comprising rear sensing means for sensing characteristics of a rear-end vehicle collision, the rear sensing means being connected to the system controlling means and providing signals to the system controlling means indicative of the sensed characteristics.

9. A vehicle occupant emergency system as claimed in claim 1, wherein the second restraining means restraining the front vehicle seat from moving forward after the front vehicle seat has been moved to the stopping means by the moving means.

10. A vehicle occupant emergency system as claimed in claim 9, wherein the vehicle occupant emergency system further comprising second releasing means for releasing the front vehicle seat from the second restraining means after a vehicle collision.

11. A vehicle occupant emergency system as claimed in claim 1, wherein the vehicle occupant emergency system further comprising locking means operated by the system controlling means for preventing the front vehicle seat from moving forward after the front vehicle seat has been moved rearward relative to its pre-emergency horizontal adjustment by the moving means, and in the event of a vehicle collision the system controlling means operating the locking means depending on the received signals and its programming.

12. A vehicle occupant emergency system as claimed in claim 11, wherein the vehicle occupant emergency system further comprising stop sensing means for activating the locking means after the front vehicle seat has been moved to the stopping means by the moving means.

13. A vehicle occupant emergency system as claimed in claim 1, wherein the vehicle occupant emergency system further comprising second locking means for preventing the front vehicle seat from moving forward relative to its pre-emergency horizontal adjustment in the event of a vehicle collision.

14. A vehicle occupant emergency system as claimed in claim 1, wherein the vehicle occupant emergency system further comprising preventing means operated by the system controlling means for preventing the front vehicle seat from moving further rearward after the front vehicle seat has been moved rearward relative to its pre-emergency horizontal adjustment by the moving means but not to the stopping means, the preventing means allowing the front vehicle seat to be adjusted to each one of the multiplicity of horizontal adjustments before a vehicle collision, and in the event of a vehicle collision the system controlling means operating the preventing means depending on the received signals and its programming.

15. A vehicle occupant emergency system as claimed in claim 1, wherein the vehicle occupant emergency system further comprising at least one switch for switching on and switching off the releasing means and the moving means.

16. A vehicle occupant emergency system as claimed in claim 1, wherein the vehicle occupant emergency system being connected with a global positioning system having an automatic collision notification system.

17. A vehicle occupant emergency system as claimed in claim 1, wherein the vehicle occupant emergency system further comprising:
a rear vehicle seat located behind the front vehicle seat for accommodating at least one occupant of the automotive vehicle; and
seventh sensing means for sensing characteristics of the at least one occupant in the rear vehicle seat, the seventh sensing means being connected to the system controlling means and providing signals to the system controlling means indicative of the sensed characteristics;
wherein the system controlling means further receiving signals from the seventh sensing means and in the event of a vehicle collision the system controlling means operating the releasing means and the moving means depending on the received signals and its programming.

18. A vehicle occupant emergency system as claimed in claim 17, wherein the vehicle occupant emergency system further comprising:
third restraining means for restraining the at least one occupant in the rear vehicle seat; and
eighth sensing means for sensing characteristics of the third restraining means, the eighth sensing means being connected to the system controlling means and providing signals to the system controlling means indicative of the sensed characteristics;
wherein the system controlling means further receiving signals from the eighth sensing means and in the event of a vehicle collision the system controlling means operating the releasing means and the moving means depending on the received signals and its programming.

19. A vehicle occupant emergency system as claimed in claim 18, wherein the third restraining means comprising second pretensioning means operated by the system controlling means for further restraining the at least one occupant in the rear vehicle seat, and in the event of a vehicle collision the system controlling means operating the second pretensioning means depending on the received signals and its programming.

20. A vehicle occupant emergency system as claimed in claim 19, wherein the vehicle occupant emergency system further comprising rear sensing means for sensing characteristics of a rear-end vehicle collision, the rear sensing means being connected to the system controlling means and providing signals to the system controlling means indicative of the sensed characteristics.

21. A vehicle occupant emergency system as claimed in claim 20, wherein the system controlling means operating the vehicle occupant emergency system a moment before a vehicle collision depending on the received signals and its programming.

22. A vehicle occupant emergency system as claimed in claim 1, wherein the stopping means comprising:
first stopping means for controlling the maximum extent, the first stopping means being removable upon application of a removing force; and
second stopping means for engaging the first stopping means and controlling the maximum extent; and
further wherein the vehicle occupant emergency system further comprising:
third stopping means for controlling a second maximum extent to which the front vehicle seat can be moved rearward relative to its pre-emergency horizontal adjustment by the moving means in the event of a vehicle collision, the third stopping means engaging the second stopping means for controlling the second maximum extent; and
removing means operated by the system controlling means for applying the removing force to the first stopping means so that the front vehicle seat can be moved to the third stopping means by the moving means in the event of a vehicle collision, and in the event of a vehicle collision the system controlling means operating the removing means depending on the received signals and its programming.

23. A vehicle occupant emergency system as claimed in claim 22, wherein the horizontal adjusting means being adapted to enable the front vehicle seat to be moved to the third stopping means by the moving means in the event of a vehicle collision.

24. A vehicle occupant emergency system as claimed in claim 22, wherein the moving means maintaining the front vehicle seat at the first stopping means or at the third stopping means after the front vehicle seat has been moved to the first stopping means or to the third stopping means by the moving means.

25. A vehicle occupant emergency system as claimed in claim 22, wherein the second restraining means restraining the front vehicle seat from moving forward after the front vehicle seat has been moved to the first stopping means or to the third stopping means by the moving means.

26. A vehicle occupant emergency system as claimed in claim 25, wherein the vehicle occupant emergency system further comprising third releasing means for releasing the front vehicle seat from the second restraining means after a vehicle collision.

27. A vehicle occupant emergency system as claimed in claim 22, wherein the third stopping means being operable by the system controlling means and in the event of a vehicle collision the system controlling means operating the third stopping means depending on the received signals and its programming.

28. A vehicle occupant emergency system as claimed in claim 22, wherein the vehicle occupant emergency system further comprising a switch for switching on and switching off the removing means.

29. A vehicle occupant emergency system as claimed in claim 22, wherein the system controlling means operating the vehicle occupant emergency system a moment before a vehicle collision depending on the received signals and its programming.

30. A vehicle occupant emergency system mounted in an automotive vehicle for protecting at least one occupant of the automotive vehicle, the vehicle occupant emergency system comprising:
- a front vehicle seat for accommodating at least one occupant of the automotive vehicle;
- horizontal adjusting means for providing the front vehicle seat with a multiplicity of horizontal adjustments relative to the automotive vehicle, the horizontal adjusting means maintaining the front vehicle seat at each one of the multiplicity of horizontal adjustments;
- system controlling means for operating the vehicle occupant emergency system;
- first sensing means for sensing characteristics of a vehicle collision, the first sensing means being connected to the system controlling means and providing signals to the system controlling means indicative of the sensed characteristics;
- rear sensing means for sensing characteristics of a rear-end vehicle collision, the rear sensing means being connected to the system controlling means and providing signals to the system controlling means indicative of the sensed characteristics;
- second sensing means for sensing characteristics of the automotive vehicle, the second sensing means being connected to the system controlling means and providing signals to the system controlling means indicative of the sensed characteristics;
- third sensing means for sensing characteristics of the environment inside and outside of the automotive vehicle, the third sensing means being connected to the system controlling means and providing signals to the system controlling means indicative of the sensed characteristics;
- releasing means operated by the system controlling means for releasing the front vehicle seat from its pre-emergency horizontal adjustment in the event of a vehicle collision so that the front vehicle seat can be moved rearward relative to its pre-emergency horizontal adjustment;
- moving means operated by the system controlling means for moving the front vehicle seat rearward relative to its pre-emergency horizontal adjustment in the event of a vehicle collision after the front vehicle seat has been released from its pre-emergency horizontal adjustment by the releasing means, the moving means allowing the front vehicle seat to be adjusted to each one of the multiplicity of horizontal adjustments before a vehicle collision;
- stopping means for controlling a maximum extent to which the front vehicle seat can be moved rearward relative to a pre-emergency horizontal adjustment by the moving means in the event of a vehicle collision;
- fourth sensing means for sensing characteristics of the front vehicle seat, the fourth sensing means being connected to the system controlling means and providing signals to the system controlling means indicative of the sensed characteristics;
- fifth sensing means for sensing characteristics of the at least one occupant in the front vehicle seat, the fifth sensing means being connected to the system controlling means and providing signals to the system controlling means indicative of the sensed characteristics;
- first restraining means for restraining the at least one occupant in the front vehicle seat, the first restraining means comprising first pretensioning means operated by the system controlling means for further restraining the at least one occupant in the front vehicle seat;
- sixth sensing means for sensing characteristics of the first restraining means, the sixth sensing means being connected to the system controlling means and providing signals to the system controlling means indicative of the sensed characteristics;
- second restraining means for restraining the front vehicle seat from moving forward after the front vehicle seat has been moved rearward relative to its pre-emergency horizontal adjustment by the moving means;
- locking means operated by the system controlling means for preventing the front vehicle seat from moving forward after the front vehicle seat has been moved rearward relative to its pre-emergency horizontal adjustment by the moving means;
- preventing means operated by the system controlling means for preventing the front vehicle seat from moving further rearward after the front vehicle seat has been moved rearward relative to its pre-emergency horizontal adjustment by the moving means but not to the stopping means, the preventing means allowing the front vehicle seat to be adjusted to each one of the multiplicity of horizontal adjustments before a vehicle collision;
- a rear vehicle seat located behind the front vehicle seat for accommodating at least one occupant of the automotive vehicle;
- seventh sensing means for sensing characteristics of the at least one occupant in the rear vehicle seat, the seventh sensing means being connected to the system controlling means and providing signals to the system controlling means indicative of the sensed characteristics;

third restraining means for restraining the at least one occupant in the rear vehicle seat, the third restraining means comprising second pretensioning means operated by the system controlling means for further restraining the at least one occupant in the rear vehicle seat; and eighth sensing means for sensing characteristics of the third restraining means, the eighth sensing means being connected to the system controlling means and providing signals to the system controlling means indicative of the sensed characteristics;

wherein the system controlling means receiving signals from the first sensing means, from the second sensing means, from the third sensing means, from the fourth sensing means, from the fifth sensing means, from the sixth sensing means, from the seventh sensing means, from the eighth sensing means, and from the rear sensing means, and in the event of a vehicle collision the system controlling means operating the releasing means, the moving means, the first pretensioning means, the second pretensioning means, the locking means and the preventing means depending on the received signals and a programming.

31. A vehicle occupant emergency system as claimed in claim 30, wherein the horizontal adjusting means being adapted to enable the front vehicle seat to be released from its pre-emergency horizontal adjustment by the releasing means and to be moved rearward relative to its pre-emergency horizontal adjustment by the moving means in the event of a vehicle collision.

32. A vehicle occupant emergency system as claimed in claim 30, wherein the horizontal adjusting means being adapted to enable the front vehicle seat to be moved to the stopping means by the moving means in the event of a vehicle collision.

33. A vehicle occupant emergency system as claimed in claim 30, wherein the releasing means allowing the front vehicle seat to be adjusted to each one of the multiplicity of horizontal adjustments before a vehicle collision.

34. A vehicle occupant emergency system as claimed in claim 30, wherein the releasing means allowing the horizontal adjusting means to maintain the front vehicle seat after the front vehicle seat has been moved rearward relative to its pre-emergency horizontal adjustment by the moving means, and the horizontal adjusting means maintaining the front vehicle seat after the front vehicle seat has been moved rearward relative to its pre-emergency horizontal adjustment by the moving means.

35. A vehicle occupant emergency system as claimed in claim 30, wherein the moving means maintaining the front vehicle seat at the stopping means after the front vehicle seat has been moved to the stopping means by the moving means.

36. A vehicle occupant emergency system as claimed in claim 30, wherein the second restraining means restraining the front vehicle seat from moving forward after the front vehicle seat has been moved to the stopping means by the moving means.

37. A vehicle occupant emergency system as claimed in claim 36, wherein the vehicle occupant emergency system further comprising second releasing means for releasing the front vehicle seat from the second restraining means after a vehicle collision.

38. A vehicle occupant emergency system as claimed in claim 30, wherein the moving means providing the front vehicle seat with a multiplicity of positions to which the front vehicle seat can be moved rearward relative to its pre-emergency horizontal adjustment in the event of a vehicle collision.

39. A vehicle occupant emergency system as claimed in claim 30, wherein the locking means providing the front vehicle seat with a multiplicity of positions to which the front vehicle seat can be moved rearward relative to its pre-emergency horizontal adjustment by the moving means in the event of a vehicle collision.

40. A vehicle occupant emergency system as claimed in claim 30, wherein the preventing means providing the front vehicle seat with a multiplicity of positions to which the front vehicle seat can be moved rearward relative to its pre-emergency horizontal adjustment by the moving means in the event of a vehicle collision.

41. A vehicle occupant emergency system as claimed in claim 30, wherein the vehicle occupant emergency system further comprising stop sensing means for activating the locking means after the front vehicle seat has been moved to the stopping means by the moving means.

42. A vehicle occupant emergency system as claimed in claim 30, wherein the vehicle occupant emergency system further comprising second locking means for preventing the front vehicle seat from moving forward relative to its pre-emergency horizontal adjustment in the event of a vehicle collision.

43. A vehicle occupant emergency system as claimed in claim 30, wherein the vehicle occupant emergency system further comprising at least one switch for switching on and switching off the releasing means and the moving means.

44. A vehicle occupant emergency system as claimed in claim 30, wherein the vehicle occupant emergency system being connected with a global positioning system having an automatic collision notification system.

45. A vehicle occupant emergency system as claimed in claim 30, wherein the system controlling means operating the vehicle occupant emergency system a moment before a vehicle collision depending on the received signals and its programming.

46. A vehicle occupant emergency system as claimed in claim 30, wherein the vehicle occupant emergency system operating in concert with at least one safety system, at least one safety device and at least one warning system.

47. A vehicle occupant emergency system as claimed in claim 30, wherein the vehicle occupant emergency system being integrated with at least one safety system, at least one safety device and at least one warning system.

48. A vehicle occupant emergency system as claimed in claim 30, wherein the vehicle occupant emergency system being integrated with at least one other vehicle occupant emergency system.

49. A vehicle occupant emergency system as claimed in claim 30, wherein the stopping means comprising:

first stopping means for controlling the maximum extent, the first stopping means being removable upon application of a removing force; and second stopping means for engaging the first stopping means and controlling the maximum extent; and further wherein the vehicle occupant emergency system further comprising:

third stopping means for controlling a second maximum extent to which the front vehicle seat can be moved rearward relative to its pre-emergency horizontal adjustment by the moving means in the event of a vehicle collision, the third stopping means engaging the second stopping means for controlling the second maximum extent; and removing means operated by the system controlling means for applying the removing force to the first stopping means so that the front vehicle seat can be moved to the third stopping means by the moving means in the event of a vehicle collision, and in the event of a vehicle collision the system controlling means operating the removing means depending on the received signals and its programming.

50. A vehicle occupant emergency system as claimed in claim 49, wherein the horizontal adjusting means being adapted to enable the front vehicle seat to be moved to the third stopping means by the moving means in the event of a vehicle collision.

51. A vehicle occupant emergency system as claimed in claim 49, wherein the moving means maintaining the front vehicle seat at the first stopping means or at the third stopping means after the front vehicle seat has been moved to the first stopping means or to the third stopping means by the moving means.

52. A vehicle occupant emergency system as claimed in claim 49, wherein the second restraining means restraining the front vehicle seat from moving forward after the front vehicle seat has been moved to the first stopping means or to the third stopping means by the moving means.

53. A vehicle occupant emergency system as claimed in claim 52, wherein the vehicle occupant emergency system further comprising third releasing means for releasing the front vehicle seat from the second restraining means after a vehicle collision.

54. A vehicle occupant emergency system as claimed in claim 49, wherein the preventing means preventing the front vehicle seat from moving further rearward after the front vehicle seat has been moved rearward relative to its pre-emergency horizontal adjustment by the moving means but not to the first stopping means or to the third stopping means.

55. A vehicle occupant emergency system as claimed in claim 49, wherein the third stopping means being operable by the system controlling means and in the event of a vehicle collision the system controlling means operating the third stopping means depending on the received signals and its programming.

56. A vehicle occupant emergency system as claimed in claim 49, wherein the vehicle occupant emergency system further comprising a switch for switching on and switching off the removing means.

57. A vehicle occupant emergency system as claimed in claim 49, wherein the system controlling means operating the vehicle occupant emergency system a moment before a vehicle collision depending on the received signals and its programming.

58. A vehicle occupant emergency system as claimed in claim 49, wherein the vehicle occupant emergency system operating in concert with at least one safety system, at least one safety device and at least one warning system.

59. A vehicle occupant emergency system as claimed in claim 49, wherein the vehicle occupant emergency system being integrated with at least one safety system, at least one safety device and at least one warning system.

60. A vehicle occupant emergency system as claimed in claim 49, wherein the vehicle occupant emergency system being integrated with at least one other vehicle occupant emergency system.

* * * * *